US008648942B2

(12) United States Patent
Spitzer et al.

(10) Patent No.: US 8,648,942 B2
(45) Date of Patent: Feb. 11, 2014

(54) METHOD OF AND APPARATUS FOR PROCESSING IMAGES USING SATURATION FUNCTIONS

(75) Inventors: Hedva Spitzer, Tel Aviv (IL); Yossi Yatir, Kiryat-Ono (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 422 days.

(21) Appl. No.: 12/808,731

(22) PCT Filed: Dec. 15, 2008

(86) PCT No.: PCT/IL2008/001623
§ 371 (c)(1),
(2), (4) Date: Sep. 16, 2010

(87) PCT Pub. No.: WO2009/081394
PCT Pub. Date: Jul. 2, 2009

(65) Prior Publication Data
US 2011/0001842 A1    Jan. 6, 2011

Related U.S. Application Data

(60) Provisional application No. 61/008,309, filed on Dec. 20, 2007.

(51) Int. Cl.
*H04N 9/64* (2006.01)
(52) U.S. Cl.
USPC .......................................................... 348/256
(58) Field of Classification Search
USPC .................. 348/207.99, 222.1, 254, 255, 256
See application file for complete search history.

(56) References Cited

U.S. PATENT DOCUMENTS

| | | | | |
|---|---|---|---|---|
| 4,384,336 A | * | 5/1983 | Frankle et al. | 382/302 |
| 5,042,077 A | | 8/1991 | Burke | |
| 5,343,254 A | | 8/1994 | Wada et al. | |
| 5,717,791 A | | 2/1998 | Labaere et al. | |
| 5,991,456 A | | 11/1999 | Rahman et al. | |
| 6,122,012 A | * | 9/2000 | Segman | 348/576 |
| 6,212,304 B1 | | 4/2001 | Durg et al. | |

(Continued)

FOREIGN PATENT DOCUMENTS

| | | |
|---|---|---|
| EP | 0901671 | 9/2003 |
| WO | WO 95/33306 | 12/1995 |

(Continued)

OTHER PUBLICATIONS

Communication Pursuant to Article 96(2) EPC Dated Apr. 6, 2006 From the European Patent Office Re.: Application No. 04712652.9.

(Continued)

*Primary Examiner* — Nicholas Giles

(57) ABSTRACT

A method suitable for processing a digital image is disclosed. The method comprises, for each picture element of the digital image, processing an achromatic intensity level of the picture element using a first adaptation procedure featuring a first effective saturation function of the achromatic intensity, to provide a first intermediate intensity level. The method further comprises processing the achromatic intensity level using a second adaptation procedure featuring a second effective saturation function of the achromatic intensity, to provide a second intermediate intensity level. The method further comprises combining the first and the second intermediate intensity levels to provide a new achromatic intensity level associated with the picture-element.

22 Claims, 24 Drawing Sheets
(17 of 24 Drawing Sheet(s) Filed in Color)

(56) References Cited

U.S. PATENT DOCUMENTS

| | | | |
|---|---|---|---|
| 6,609,135 | B1 | 8/2003 | Omori et al. |
| 6,674,544 | B2 | 1/2004 | Shiota et al. |
| 6,724,435 | B2* | 4/2004 | Segman .................. 348/576 |
| 6,788,822 | B1 | 9/2004 | Zhang et al. |
| 6,912,307 | B2 | 6/2005 | Spitzer et al. |
| 6,931,152 | B2 | 8/2005 | Spitzer |
| 6,947,176 | B1 | 9/2005 | Kubo et al. |
| 7,142,704 | B2 | 11/2006 | Hara |
| 7,489,814 | B2 | 2/2009 | Spitzer et al. |
| 7,893,974 | B2* | 2/2011 | Chiba .................... 348/252 |
| 8,131,109 | B2 | 3/2012 | Kim et al. |
| 2001/0041004 | A1 | 11/2001 | Shefer |
| 2002/0154323 | A1 | 10/2002 | Sobol et al. |
| 2003/0026494 | A1 | 2/2003 | Woodell et al. |
| 2003/0123719 | A1 | 7/2003 | Kurahashi |
| 2004/0091164 | A1 | 5/2004 | Sakatani et al. |
| 2004/0165086 | A1* | 8/2004 | Spitzer et al. ............ 348/239 |
| 2005/0089240 | A1 | 4/2005 | Gallagher et al. |
| 2006/0013478 | A1* | 1/2006 | Ito et al. ................. 382/167 |
| 2006/0119713 | A1* | 6/2006 | Deguchi et al. .......... 348/231.7 |
| 2007/0071350 | A1 | 3/2007 | Lee et al. |
| 2007/0076127 | A1* | 4/2007 | Abe et al. ................ 348/645 |
| 2007/0269095 | A1* | 11/2007 | Couwenhoven et al. ..... 382/132 |
| 2008/0031538 | A1* | 2/2008 | Jiang et al. .............. 382/261 |
| 2009/0303345 | A1* | 12/2009 | Deguchi et al. .......... 348/223.1 |
| 2011/0001842 | A1 | 1/2011 | Spitzer et al. |
| 2012/0201456 | A1 | 8/2012 | El-Mahdy et al. |
| 2012/0257808 | A1 | 10/2012 | Spitzer et al. |
| 2013/0011029 | A1 | 1/2013 | Ron et al. |
| 2013/0148908 | A1 | 6/2013 | Barkan et al. |

FOREIGN PATENT DOCUMENTS

| | | |
|---|---|---|
| WO | WO 2004/075535 | 9/2004 |
| WO | WO 2009/057106 | 5/2009 |
| WO | WO 2009/081394 | 7/2009 |
| WO | WO 2012/017440 | 2/2012 |

OTHER PUBLICATIONS

Official Action Dated May 29, 2008 From the US Patent and Trademark Office Re.: U.S. Appl. No. 10/369,671.
Communication Pursuant to Article 94(3) EPC Dated May 25, 2009 From the European Patent Office Re.: Application No. 04712652.9.
International Search Report and the Written Opinion Dated Nov. 15, 2011 From the International Searching Authority Re. Application No. PCT/IL2011/000639.
Notice of Allowance Dated Oct. 31, 2008 From the US Patent and Trademark Office Re.: U.S. Appl. No. 10/369,671.
Barkan et al. "Brightness Contrast-Contrast Induction Model Predicts Assimilation and Inverted Assimilation Effects", Journal of Vision, XP002659387, 8(7): 1-26, Oct. 17, 2008.
Creutzfeldt et al. "The Neurophysiological Correlates of Colour and Brightness Contrast in Lateral Geniculate Neurons. II. Adaption and Surround Effects", Experimental Brain Research, 87: 22-45, 1991.
Creutzfeldt et al. "The Neurophysiological Correlates of Colour and Brightness Contrast6 in Lateral Geniculate Neurons. I. Population Analysis", Experimental Brain Research, 87: 3-21, 1991.
Farbman et al. "Edge-Preserving Decompositions for Multi-Scale Tone and Detail Manipulation", ACM Transactions on Graphics, XP055011074, 27(3/Art.67): 67-1-67-10, Aug. 2008. Section 6.1.
Fattal et al. "Gradient Domain High Dynamic Range Compression", Proceedings of the ACM SIGGRAPH, p. 249-256, 2002.
Fattal et al. "Multiscale Shape and Detail Enhancement From Multi-Light Image Collections", ACM Transactions on Graphics, XP055011081, 26(3/Art.51): 51-1-51-9, Jul. 29, 2007. Sections 3-5, Fig.2.
Jobson et al. "A Multiscale Retinex for Bridging the Gap Between Color Images and the Human Observation of Scenes", IEEE Transactions on Image Processing, 6(7): 965-976, 1997.
Li et al. "Compressing and Companding High Dynamic Range Images With Subband Architectures", Proceedings of ACM SIGGRAPH 2005, ACM Transactions on Graphics, XP003010843, 24(3): 836-844, Jul. 2005.

Mead "Analog VLSI and Neural Systems", Table of Contents, Addison-Wesley, XV-XXII, 1989.
Naka et al. "S-Potentials From Colour Units in the Retina of Fish (Cyprinidae)", Journal of Physiology, 185: 536-555, 1966.
Norman et al. "Cone Photoreceptor Physiology and Cone Contributions to Colour Vision", The Perception of Colour, p. 146-162, 1991.
Pattanaik et al. "Adaptive Gain Control for High Dynamic Range Image Display", Proceedings of Spring Conference in Computer Graphics (SCCG2002), Budmerice, Slovakia, 7 P., 2002.
Rahman et al. "A Multiscale Retinex for Color Rendition and Dynamic Range Compression", SPIE International Symposium on Optical Science, Engineering, and Instrumentation, Applications of Digital Image Processing XIV, 2825: 9 P., 1996.
Spitzer et al. "Biological Gain Control for High Dynamic Range Compression", Final Program and Proceedings of the IS & T & SID—11th Color Imaging Conference: Color Science and Engineering: Systems, Technologies, Applications, p. 42-50, 2003.
Spitzer et al. "Color Constancy: A Biological Model and Its Application for Still and Video Images", Pattern Recognition, 35(8): 1645-1659, 2002. Abstract, Sec.2: Model From p. 1646-1649, Sec.4.4: Video Sequences, p. 1656-1658, Fig. 1.
Toet Adaptive Multi-Scale Contrast Enhencement Through Non-Linear Pyramid Recombination, Pattern Recognition Letters, XP000168635, 11(11): 735-742, Nov. 1, 1990. Abstract, Sections 2-3.
Wyszecki et al. "Color Science Concepts and Methods, Quantitative Data and Formulae", Wiley & Sons, 2000. Short Description. p. 156-166.
International Search Report Dated Apr. 9, 2009 From the International Searching Authority Re.: Application No. PCT/IL2008/001623.
Written Opinion Dated Apr. 9, 2009 From the International Searching Authority Re.: Application No. PCT/IL2008/001623.
International Preliminary Report on Patentability Dated Jul. 1, 2010 From the International Bureau of WIPO Re. Application No. PCT/IL2008/001623.
International Preliminary Report on Patentability Dated May 14, 2010 From the International Bureau of WIPO Re.: Application No. PCT/IL2008/001419.
International Search Report Dated Feb. 3, 2009 From the International Searching Authority Re.: Application No. PCT/IL2008/001419.
Written Opinion Dated Feb. 3, 2009 From the International Searching Authority Re.: Application No. PCT/IL2008/001419.
Bae et al. "Aortic and Hepatic Contrast Medium Enhancement at CT. Part I. Prediction With a Computer Model", Radiology, 207: 647-655, 1998.
Barnes "Characteristics and Control of Contrast in CT", RadioGraphics, 12: 825-837, 1992.
Bartz et al. "Volumetric High Dynamic Range Windowing for Better Data Representation", Proceedings of the 4th International Conference on Computer Graphics, Virtual Reality, Visualization and Interaction in Africa, Cape Town, South Africa, AFRIGRAPH, p. 137-144, Jan. 25-27, 2006.
Chang et al. "Image Contrast Enhancement Based on a Histogram Transformation of Local Standard Deviation", IEEE Transcation on Medical Imaging, 17(4): 518-531, Aug. 1998.
Cromartie et al. "Edge-Affected Context for Adaptive Contrast Enhancement", Proceedings of the XIIth International Meeting on Information Processing in Medical imaging: Lecture Notes in Computer Science, p. 474-485, 1991.
Duan et al. "Comprehensive Fast Tone Mapping for High Dynamic Range Image Visualization", Proceedings of Pacific Graphics, p. 1-9, 2005.
D'Zmura et al. "Contrast Gain Control", Color Vision: From Genes to Perception, Chap.19: 369-385, 1999.
Fayad et al. "Chest CT Window Settings With Multiscale Adaptive Histogram Equalization: Pilot Study", Radiology, 223: 845-852, 2002.
Hara et al. "Generalized Dynamic Range Compresiion Algorithm for Visualization of Chest CT Images", Medical Imaging 2004: Visualization, Image-Guided Procedures, and Display, Proceedings of the SPIE, 5367: 578-585, 2004.

(56) References Cited

OTHER PUBLICATIONS

Ji et al. "Adaptive Image Contrast Enhancement Based on Human Visual Properties", IEEE Transactions on Medical Imgaing, 13(4): 573-568, Dec. 1994.
Jin et al. "Contrast Enhancement by Multi-Scale Adaptive Histogram Equalization", SPIE Proceedings Series, 4478: 206-213, 2001.
John et al. "Performance of a Single Lookup Table (LUT) for Displaying Chest CT Images", Academic Radiology, 11: 609-616, 2004.
Lehr et al. "Body Computed Tomography: Histogram Equalization of CT Images", Radiology, 154: 163-169, 1985.
Lerman et al. "Contrast Enhancement of Soft Tissues in Computed Tomography Images", Medical Imaging 2006: Image Processing, Proceedings of the SPIE, 6144: 2103-2110, 2006.
Li et al. "Compressing and Companding High Dynamic Range Images With Subband Architectures", ACM Transactions on Graphics, Proceedings of ACM SIGGRAPH, 24(3): 836-844, 2005.
Olzak et al. "Multiple Gain Control Processes in Contrast-Contrast Phenomena", Vision Research, 39: 3983-3987, 1999.
Pizer et al. "Adaptive Histogram Equalization and Its Variations", Computer Vision, Graphics, and Image Processing, 39: 355-368, 1987.
Pizer et al. "Contrast-Limited Adaptive Histogram Equalization: Speed and Effectiveness", Proceedings of the First Conference on Visualization in Biomedical Computing, Atlanta, GA, USA, p. 337-345, May 22-25, 1990.
Socolinsky "Dynamic Range Constraints in Image Fusion and Visualization", Proceedings of the Signal and Image Processing, 6 P., 2000.
Spitzer et al. "Biological Gain Control for High Dynamic Range Compression", Final Program and Proceedings of the IS&T/SID 11th Color Imaging Conference: Color Science, Systems, and Applications, Scottdale, Arizona, USA, XP002282584, p. 42-50, Nov. 3, 2003. p. 42-45, Fig. 1.
Spitzer et al. "Improvement of Illumination Artifacts in Medical Ultrasound Images Using a Biologically Based Algorithm for Compression of Wide Dynamic Range", Proceedings of the 2004 11th IEEE International Conference on Electronics, Circuits and Systems, ICECS 2004, Tel Aviv, Israel, Dec. 13-15, 2004, XP010774289, p. 435-438, Dec. 13, 2004.
Stark "Adaptive Image Contrast Enhancement Using Generalizations of Histogram Equalization", IRRR Transactions on Image Processing, 9(5): 889-896, May 2000.
Xing et al. "Measurement and Modeling of Center-Surround Suppression and Enhancement", Vision Research, 41: 571-583, 2001.
Yu et al. "A Fast and Adaptive Method for Image Contrast Enhancement", IEEE International Conference on Image Processing, ICIP 2004, Singapore, Oct. 24-27, 2004, 4 P., 2004.
Zimmerman et al. "An Evaluation of the Effectiveness of Adaptive Histogram Equalization for Contrast Enhancement", IEEE Transactions on Medical Imaging, 7(4): 304312, Dec. 1988.
Zuiderveld "Contrast limited Adaptive Histogram Equalization", Academic Press Graphics Gems Series, Graphic Gems IV, Chap. VIII.5: 474-485, 1994.
Communication Pursuant to Article 94(3) EPC Dated Dec. 1, 2011 From the European Patent Office Re.: Application No. 04712652.9.
International Preliminary Report on Patentability Dated Feb. 14, 2013 From the International Bureau of WIPO Re. Application No. PCT/IL2011/000639.
Official Action Dated Mar. 13, 2013 From the US Patent and Trademark Office Re. U.S. Appl. No. 12/740,351.
Burt et al. "The Laplacian Pyramid as a Compact Image Code", IEEE Transactions on Communications, Com-31(4): 532-540, Apr. 1983.
Rizzi et al. "A Modified Algorithm for Perceived Contrast Measure in Digital Images", 4th European Conference on Graphics, Imaging and Vision, 10th International Sympsoium on Multispectral Color Science: CGIV/MCS'08, Jun. 9-13, 2008, Barcelona, Espana, Final Program and Proceedings, p. 249-252, 2008.
Official Action Dated Nov. 19, 2013 From the US Patent and Trademark Office Re. U.S. Appl. No. 12/740,351.
Chaturvedi et al. "2-D Companding for Noise Reduction in Strain Imaging", IEEE Transactions on Ultrasonics, Perroelectrics, and Frequency Control, 45(1): 179-191, Jan. 1998.
Greenleaf et al. "Selected Methods for Image Elastic Properties of Biological Tissues", Annual Review of Biomedical Engineering, 5: 57-78, 2003.

\* cited by examiner

| 34 | 34 | 34 | 34 | 34 | 34 | 34 |
|----|----|----|----|----|----|----|
| 34 | 34 | 34 | 34 | 34 | 34 | 34 |
| 34 | 34 | 32 | 32 | 32 | 34 | 34 |
| 34 | 34 | 32 | 20 | 32 | 34 | 34 |
| 34 | 34 | 32 | 32 | 32 | 34 | 34 |
| 34 | 34 | 34 | 34 | 34 | 34 | 34 |
| 34 | 34 | 34 | 34 | 34 | 34 | 34 |

 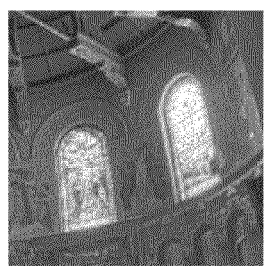 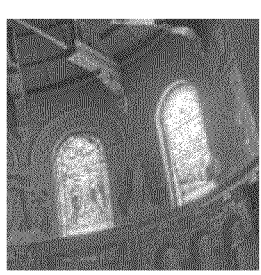 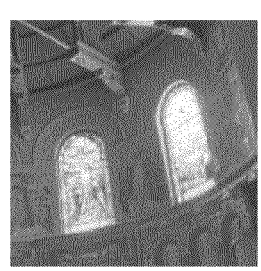
FIG. 20A    FIG. 20B    FIG. 20C    FIG. 20D
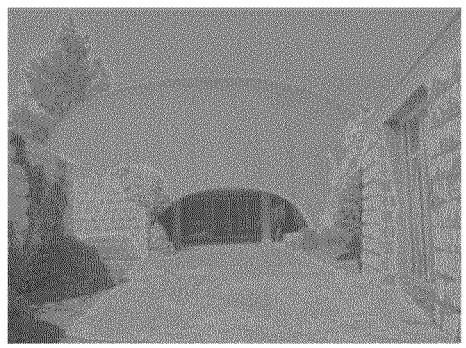 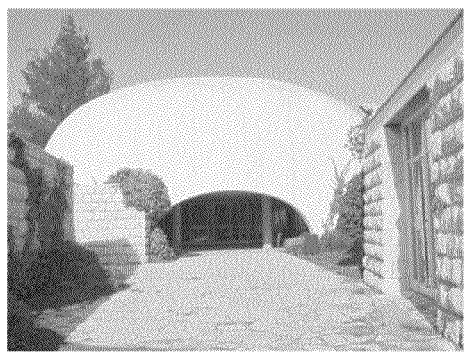
FIG. 21A    FIG. 21B
 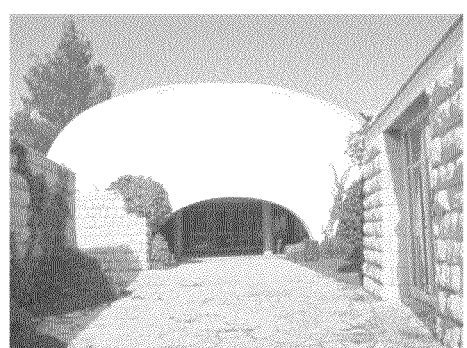
FIG. 21C    FIG. 21D

1

METHOD OF AND APPARATUS FOR PROCESSING IMAGES USING SATURATION FUNCTIONS

RELATED APPLICATIONS

This Application is a National Phase of PCT Patent Application No. PCT/IL2008/001623 having International filing date of Dec. 15, 2008, which claims the benefit of U.S. Provisional Patent Application No. 61/008,309 filed on Dec. 20, 2007. The contents of the above Applications are all incorporated herein by reference.

FIELD AND BACKGROUND OF THE INVENTION

The present invention relates to image processing and, more particularly, to apparatus and method for processing high dynamic range images.

Digital images may contain a huge amount of data, especially for high quality display and printing. Commercially available digital imaging devices are known to acquire image information across a wide dynamic range of several orders of magnitude. Additionally, there are software solutions which fuse multiple exposures of the same scene at lower dynamic range into one image of higher dynamic range.

Typically, although at the time of image capture the acquired dynamic range is rather large, a substantial portion of it is lost once the image is digitized, printed or displayed. For example, most images are digitized to 8-bits (256 levels) per color-band, i.e., a dynamic range of about two orders of magnitude. The problem is aggravated once the image is transferred to a display or a print medium which is often limited to about 50 levels per color-band.

The motivation for developing imaging devices capable of capturing high dynamic range images is explained by the enormous gap between the performances of the presently available devices and the ability of the human visual system to acquire detailed information from a high dynamic range scene. Specifically, the human visual system, which is capable of acquiring a dynamic range of several orders of magnitude, can easily recognize objects in natural light having a high dynamic range. On the other hand, high quality images suffer, once displayed on a screen or printed as a hard copy, from loss of information, e.g., at extreme light intensities, within shadows, dark regions, extremely bright regions and/or surfaces close to a lightening source. For example, when the difference in intensities between a shaded object and its illuminated surroundings reaches a dynamic range of 2 orders of magnitudes, presently available display devices may not be able to recognize it. Another severe problem is that in a specific exposure a dark region of the image may be seen while a bright region is over exposed, or vise versa.

Over the past decade, attempts have been made to develop techniques for compressing the dynamic range of images to allow them to be displayed.

One such technique is found in R. Fattal et al., "Gradient Domain High Dynamic Range Compression", *Proc. ACM SIGGRAPH*, 2002, where large gradients are attenuated and a low gradient display is constructs by solving the Poisson equation on a modified gradient field. In an additional technique, primarily directed at correcting halo artifacts, high contrast edges are detected while the influence of extreme pixels whose intensity variations are above a factor of 5 are removed, to obtain a dynamic range without the halo artifacts [Pattanaik et al., *Proc. SCCG,* 24-27, 2002].

The rational behind the above methods was primarily of mathematical or physical nature. In addition, there are also several methods for compression of a dynamic range of an image, which are based on psychophysiological findings.

It is commonly believed that the ability of the human visual system to acquire wide range of illuminations in the same scene is through physiological phenomena known as lightness constancy and lightness gain control. Physiological findings have shown [O. D. Creutzfeldt et al., "The Neurophysiological Correlates of Color and Brightness Contrast in Lateral Geniculate Neurons: I. Population Analysis, and II. Adaptation and Surround Effects", *Exp. Brain Res.,* 87:1-21, 22-45, 1991] that the induction phenomenon is originated in the retinal receptors and ganglion cells, where in addition to central receptors in the receptive field, surrounding and remote regions of receptors, are inputted to the ganglion cells. It is hypothesized that the peripheral area (remote region) that extends far beyond the borders of the classical receptive field of the ganglion cells is also inputted to the ganglion cells, thereby affecting the perceived image.

Several attempts have been made to apply human vision theories to image processing. For example, in the so called "Retinex model" disclosed in U.S. Pat. No. 5,991,456, logarithms of intensity values are subtracted so as to adjust the intensity of a specific pixel using its surrounding pixels (see also, Jobson et al., "A Multiscale Retinex for Bridging the Gap Between Color Images and the Human Observation of Scenes", published in *IEEE Trans. Image Processing* 6:965-976, 1997; Rahman, Z et al., "A Multi Retinex for Color Rendition and Dynamic Range Compression", *SPIE International Symposium on Optical Science, Engineering, and Instrumentation, conference on Signal and Image Processing*; and B. Funt and F. Ciurea, "Parameters for Retinex," *AIC'2001 Proc. 9th Congress of the International Color Association, Rochester*, June 2001).

International Patent Application No. IL2004/000159, the contents of which are hereby incorporated by reference, discloses a technique in which employs regional adaptation weight-functions. Specifically, the technique associates a center region, a surround region and a remote region for each pixel of the image, and applies a center-remote adaptation weight-function and a surround-remote adaptation weight-function for updating a new intensity level to the pixel.

Also of prior art of relevance is International Application No. WO 95/33306, which discloses a signal processor that performs a real time approximation of the non-causal feedback Automatic Gain Control model, for natural process occurring in biological sensors.

SUMMARY OF THE INVENTION

In various exemplary embodiments of the invention a digital image is processed by using two or more adaptation procedures, which are preferably employed on the achromatic channel of the digital image. When two adaptation procedures are employed, one adaptation procedure can incorporate a first effective saturation function of the intensity and another adaptation procedure can incorporate a second effective saturation function of the intensity. The first effective saturation function is typically different from the second effective saturation function The intensity level of each picture-element (e.g., a pixel) of the digital image is processed by at least two of the adaptation procedures. The result of each processing is an intermediate intensity level. All the intermediate intensity levels of the picture-element are then combined (e.g., via a linear combination) to provide a new achromatic intensity.

The teachings of present invention can be applied for the analysis of monochromatic or polychromatic images.

In embodiments in which the digital image is monochromatic, the picture-elements are typically associated with gray level values which can be used in various exemplary embodiments of the invention as achromatic intensity values. In embodiments in which the picture-elements of the digital image comprise polychromatic data (rather than achromatic intensity values), the achromatic intensity value associated with each picture-element can be extracted, e.g., by transforming the polychromatic data to a color space which includes an achromatic channel. Once a new achromatic intensity value is assigned to the picture-element, the polychromatic data of the picture-element can be restored by applying a backward transformation using the new achromatic intensity value so as to provide new polychromatic data.

In various exemplary embodiments of the invention at least one, more preferably each adaptation procedure comprises a positive contribution calculated using a central saturation function and a negative contribution calculated using a peripheral saturation function. Each of the central and peripheral saturation functions receives an input intensity level and returns an output intensity level, which is then used in the calculation of the intermediate intensity level. The functions are "saturation" functions in the sense that for sufficiently high input intensities, large variations of the input results in small vitiation of the output. One or more of the parameters of the saturation functions (hence also the curves describing the functions) are preferably selected according to the intensity levels of the digital image.

Thus, the saturation functions used for processing two different picture-elements can be different. The curve describing the saturation function used for processing the picture-element with the higher intensity is typically higher than the curve describing the saturation function used for processing the picture-element with the lower intensity. Yet, the height difference between the two curves depends on the adaptation procedure being employed for processing the picture-elements. Generally, the height difference between the curves is more pronounced when the first adaptation procedure is employed than when the second adaptation procedure is employed.

The teachings of the present invention can be applied for the analysis of a single still image, a sequence of still images or a video image, which in various exemplary embodiments of the invention is realized as a video sequence of images.

When a single still image is analyzed, the intensity level of each picture-element can be processed using a single pair of saturation functions (central and peripheral), which, as stated, can be selected according to the intensity level of the picture-element.

When a video sequence of images is analyzed, the pair of saturation functions used for processing a particular picture-element can evolve with time. Thus, in this embodiment, one or more of the parameters of the saturation functions are selected according to the intensity level as well as the elapsed time. In various exemplary embodiments of the invention a process referred to as "curve shifting" is employed.

In these embodiments, the curve describing the saturation function used for processing a given intensity level at a given instant can be higher than the curve describing the saturation function used for processing the same intensity level at a previous instant. Yet, the height difference between the curve at one instant and the curve at a previous instant depends on the adaptation procedure being employed for processing the picture-elements. Generally, the height difference between the curves is more pronounced when the first adaptation procedure is employed than when the second adaptation procedure is employed.

According to an aspect of some embodiments of the present invention there is provided a method of processing a digital image having a plurality of picture-elements. The method comprises, for each picture element of the digital image: (a) processing an achromatic intensity level of the picture element using a first adaptation procedure featuring a first effective saturation function of the achromatic intensity, to provide a first intermediate intensity level; and (b) processing the achromatic intensity level using a second adaptation procedure featuring a second effective saturation function of the achromatic intensity, to provide a second intermediate intensity level; thereby processing the digital image. In various exemplary embodiments of the invention the method further comprises (c) combining the first and the second intermediate intensity levels to provide a new achromatic intensity level associated with the picture-element.

According to some embodiments of the present invention each of the first and second effective saturation functions is characterized by an increment rate and a plateau level, and wherein the plateau level of the first effective saturation function is higher than the plateau level of the second monotonic function.

According to some embodiments of the present invention the increment rate of the first effective saturation function is higher than the increment rate of the second effective saturation function.

According to some embodiments of the present invention the picture element is associated with polychromatic data and the method further comprises extracting the achromatic intensity level from the polychromatic data.

According to some embodiments of the present invention the method further comprises calculating new polychromatic data using the new achromatic intensity level, and associating the new polychromatic data with the picture-element.

According to some embodiments of the present invention the method further comprises employing a procedure for reducing halo artifacts from the digital image.

According to some embodiments of the present invention the method is adapted for reducing a dynamic range of the digital image by at least 5 orders of magnitude.

According to an aspect of some embodiments of the present invention there is provided an apparatus for processing a digital image having a plurality of picture-elements, referred to hereinunder as an image processing apparatus. The apparatus comprises: (a) a first processing unit, for processing an achromatic intensity level of each picture element using a first adaptation procedure featuring a first effective saturation function of the achromatic intensity, to provide a first intermediate intensity level; and (b) a second processing unit, for processing an achromatic intensity level of each picture element using a second adaptation procedure featuring a second effective saturation function of the achromatic intensity, to provide a second intermediate intensity level. In various exemplary embodiments of the invention the image processing apparatus further comprises (c) an intensity combiner, for combining, for each picture-element, a respective first intermediate intensity level and a respective second intermediate intensity level to provide a new achromatic intensity level associated with the picture-element.

According to an aspect of some embodiments of the present invention there is provided an imaging device, comprising an image capturing device for capturing a digital image, and the image processing apparatus for processing the digital image.

According to some embodiments of the present invention the picture element is associated with polychromatic data and the apparatus further comprises an intensity extractor for extracting the achromatic intensity level from the polychromatic data.

According to some embodiments of the present invention the image processing apparatus further comprises a calculation unit for calculating new polychromatic data using the new achromatic intensity level, and associating the new polychromatic data with the picture-element.

According to some embodiments of the present invention the image processing apparatus further comprises a halo artifacts reduction unit configured for employing a procedure for reducing halo artifacts from the digital image.

According to some embodiments of the present invention the image processing apparatus is adapted for reducing a dynamic range of the digital image by at least 5 orders of magnitude.

According to some embodiments of the present invention the new achromatic intensity level is a sum of the first and the second intermediate intensity levels.

According to some embodiments of the present invention the sum is a weighted sum.

According to some embodiments of the present invention the procedure for reducing the halo artifacts is characterized by an intensity threshold which is a function of a dynamic range characterizing the digital image.

According to some embodiments of the present invention at least one of the first adaptation procedure and the second adaptation procedure comprises a positive contribution calculated using a central saturation function, and a negative contribution calculated using a peripheral saturation function being different from the central saturation function.

According to some embodiments of the present invention each saturation function comprises an adaptation function having a local term and a nonlocal term.

According to some embodiments of the present invention the intensity level is static, hence the plurality of picture elements constitutes a still image.

According to some embodiments of the present invention the intensity level varies with time hence the plurality of picture elements constitutes a sequence of images.

According to some embodiments of the present invention the sequence of images is a video sequence of images.

According to some embodiments of the present invention the image capturing device is selected from the group consisting of a digital camera, a video camera and a CMOS digital camera, a scanner, a computerized tomography scanner, a magnetic resonance imaging scanner, an ultrasonic scanner, an endoscopic imaging device, a radio telescope, a digital telescope and a digital microscope.

The present invention successfully addresses the shortcomings of the presently known configurations by providing apparatus and method for modulating the dynamic range of a high dynamic range image.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is herein described, by way of example only, with reference to the accompanying drawings and images. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic cross section of the human retina.

FIG. 2 is a flowchart diagram of a method suitable for method of processing a digital image according to various exemplary embodiments of the present invention;

Figure 3A:
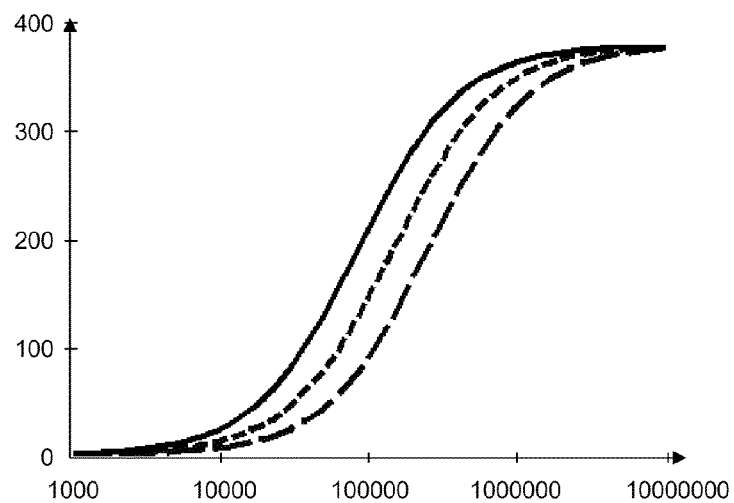
Figure 3B:
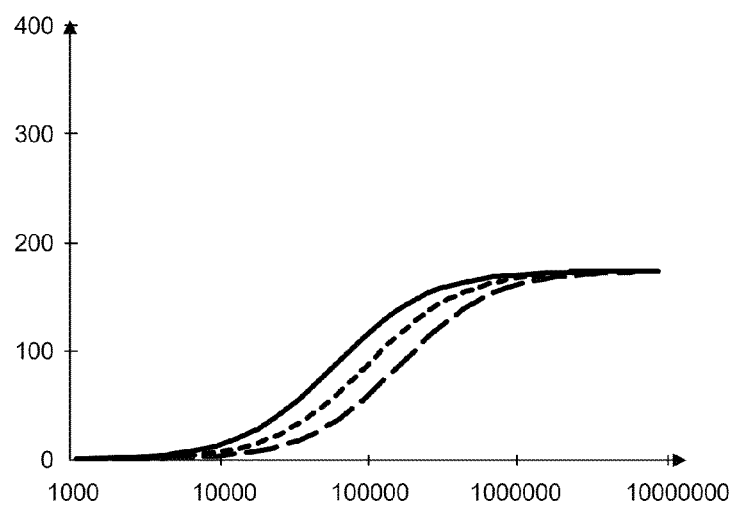

FIGS. 3A-B are schematic illustrations of response curve, in accordance with preferred embodiments of the present invention.

FIG. 3C is a schematic illustration of a rectangular grid of picture-elements which exemplifies a concept of center, surround and remote regions, according to various exemplary embodiments of the invention.

Figure 4A:
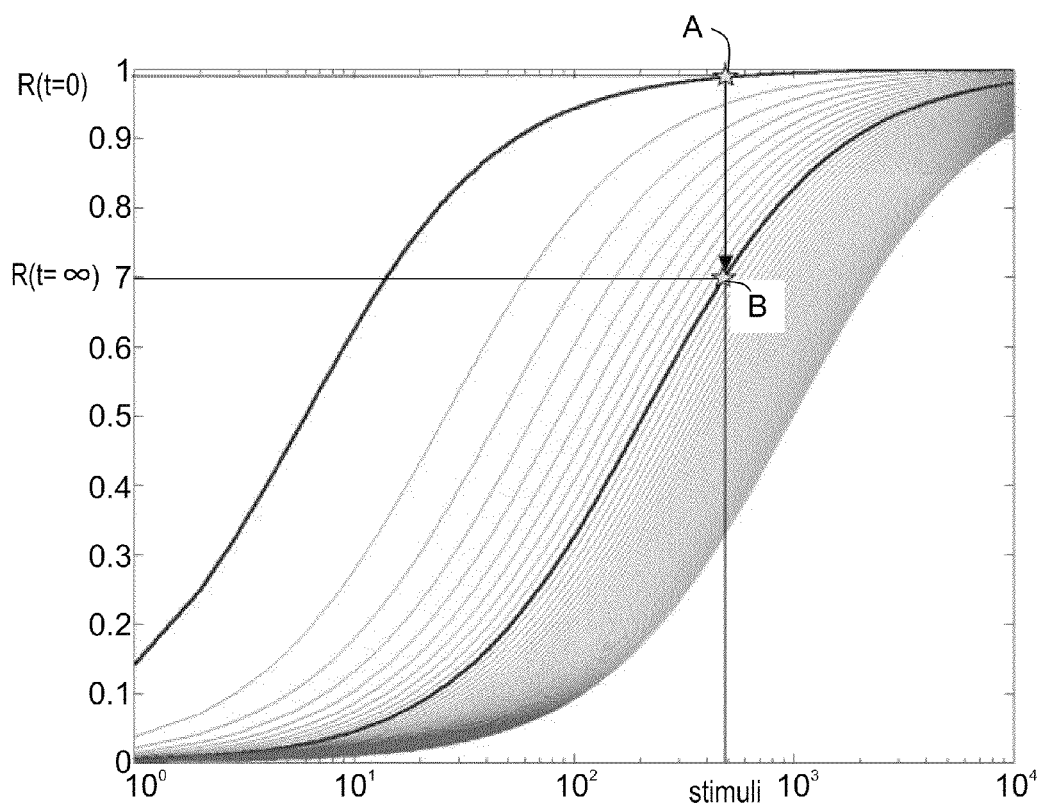
Figure 4B:
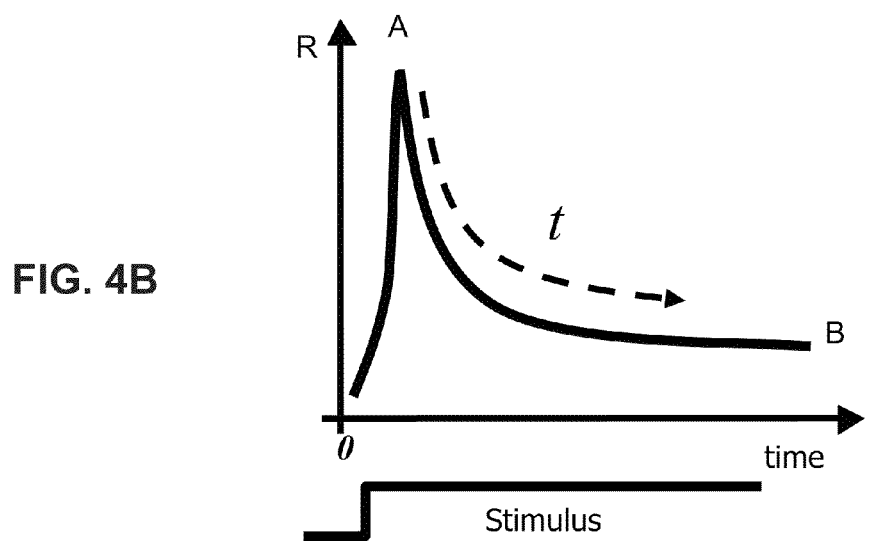

FIG. 4A shows a plurality of intensity curves having a logarithmic stimulus scale, according to various exemplary embodiments of the present invention;

FIG. 4B is a schematic illustration of a curve-shifting process, according to various exemplary embodiments of the invention.

Figure 5:
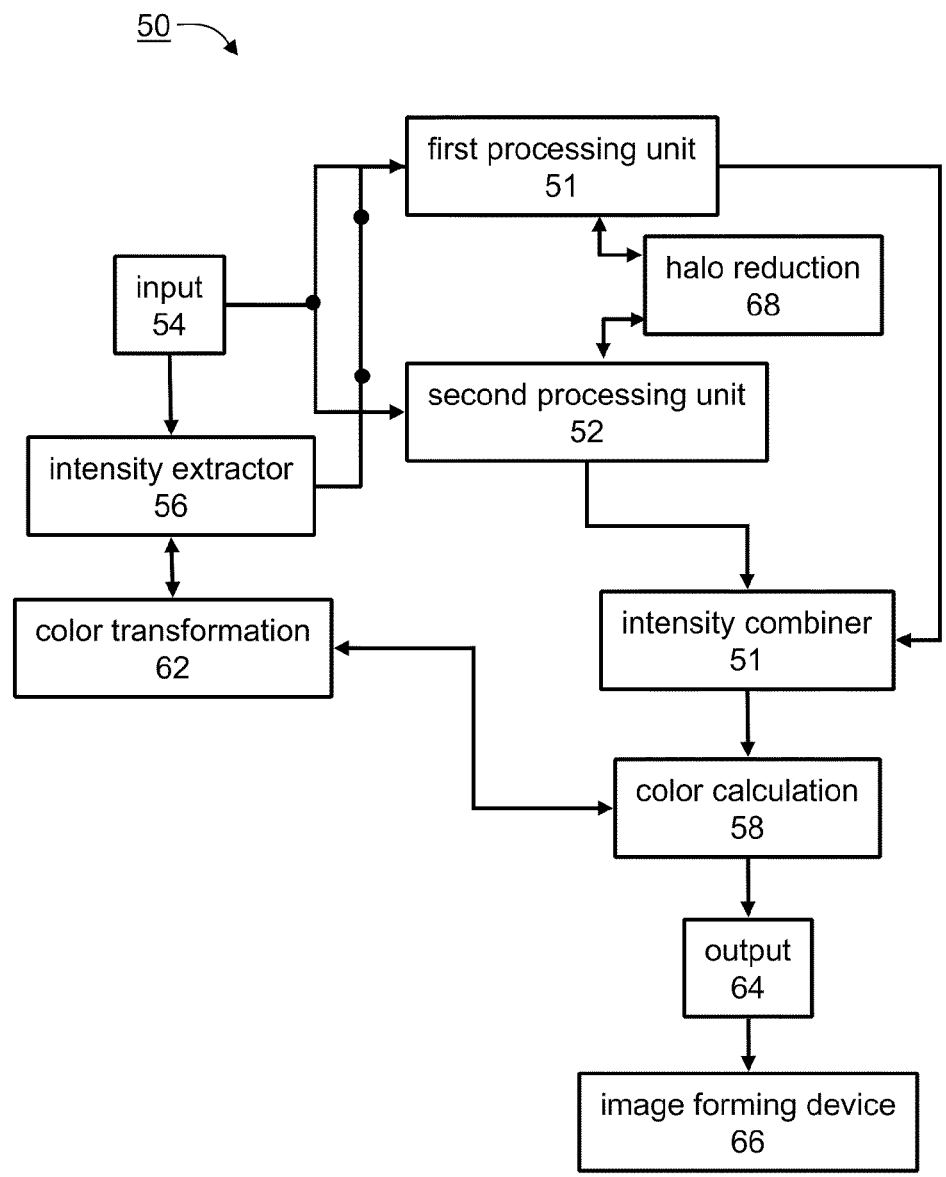

FIG. 5 is a schematic illustration of an apparatus for processing a digital image, according to various exemplary embodiments of the present invention.

Figure 6:
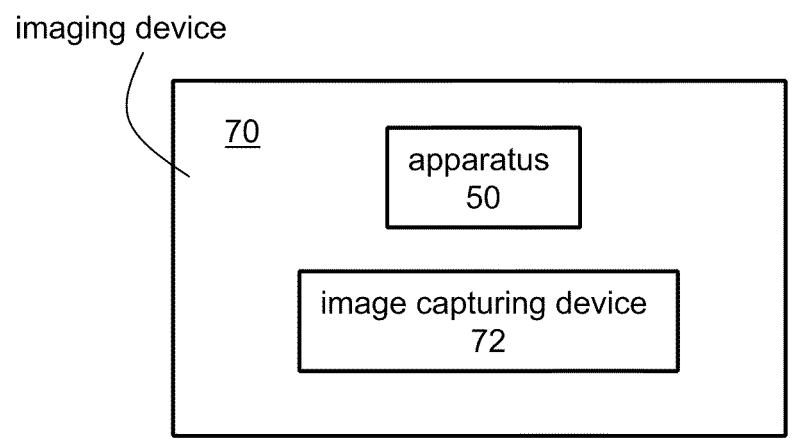

FIG. 6 is a schematic illustration of an imaging device, according to various exemplary embodiments of the present invention.

Figure 7:
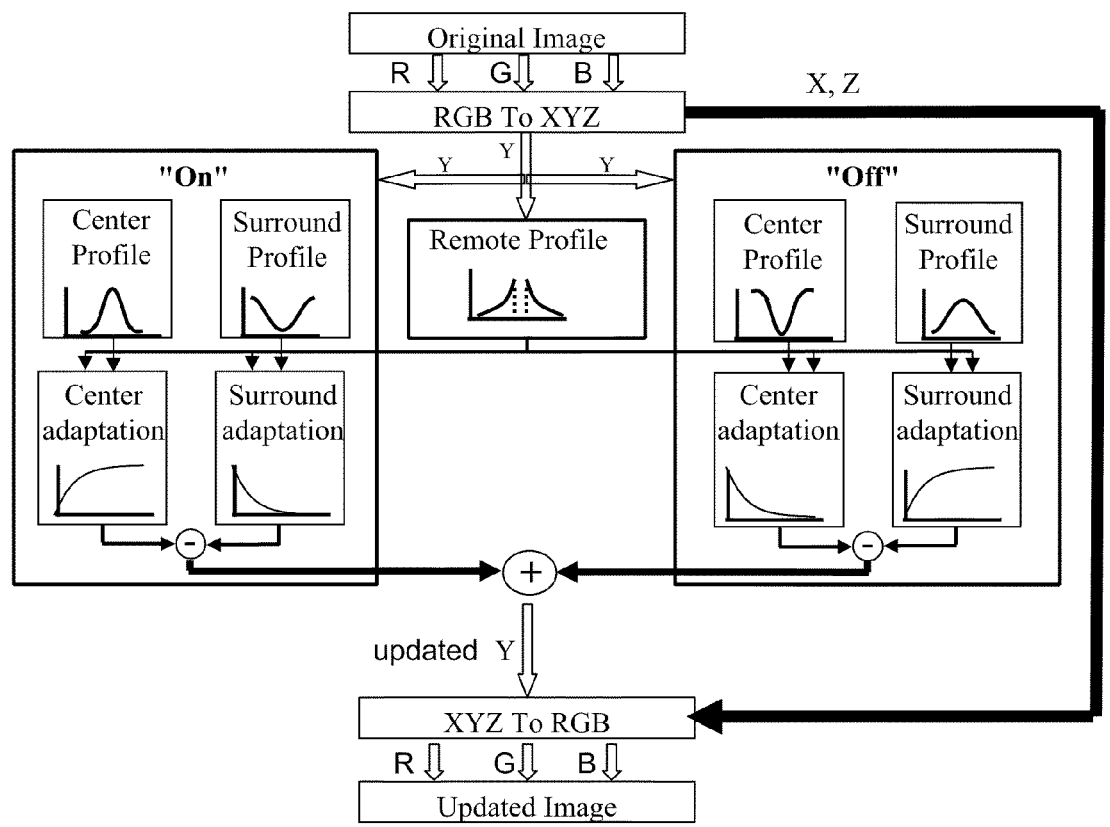

FIG. 7 is a flowchart diagram of a method employed in experiments performed in accordance with preferred embodiments of the present invention.

Figure 8:
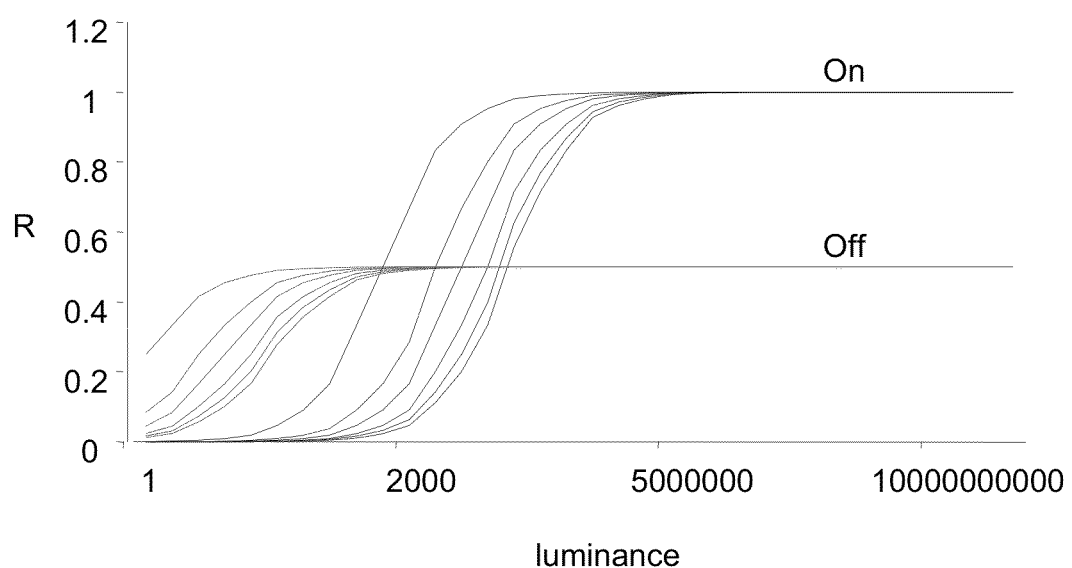

FIG. 8 illustrates response curves of an "On" procedure and an "Off" procedure which were employed in the experiments.

Figure 9A:
Figure 9B:

FIGS. 9A-B are two processed images with different relative weights for the "On" and "Off" procedures, as obtained according to various exemplary embodiments of the present invention.

FIGS. 10A-C and 11A-C are results obtained when only the "On" procedure was employed (FIGS. 10A and 11A), only the "Off" procedure was employed (FIGS. 10B and 11B), and both procedures (FIGS. 10C and 11C), according to various exemplary embodiments of the present invention.

Figure 10A:
Figure 10B:
Figure 10C:

FIGS. 12A-D present intermediate (FIGS. 12A-B) and new (FIGS. 12C-D) intensity as a function of the luminance for the images of FIGS. 10A-C, as calculated according to various exemplary embodiments of the present invention.

Figure 11C:
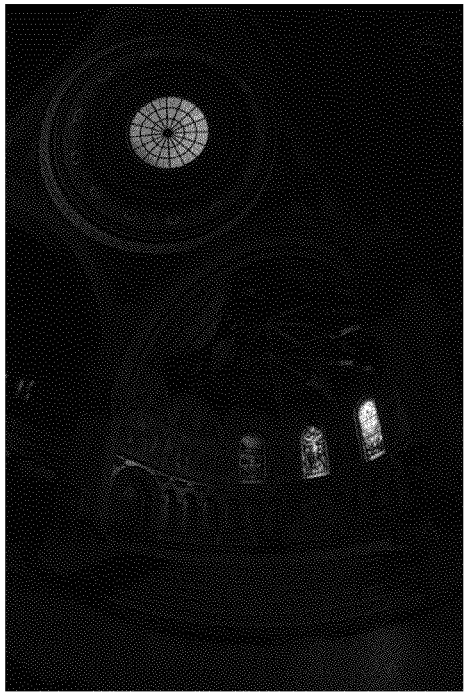
Figure 11C:
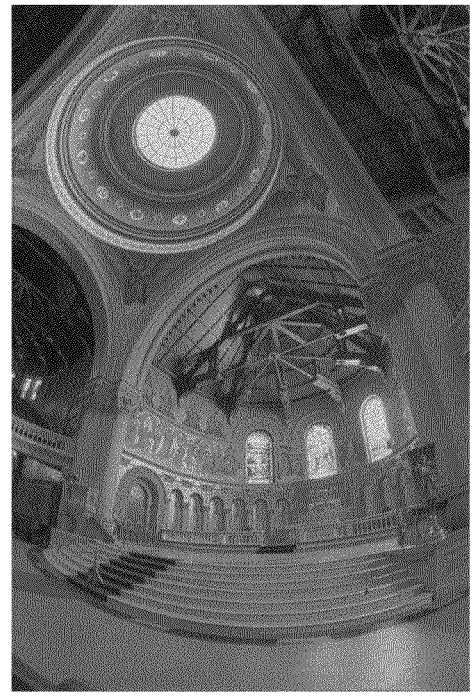
Figure 11C:
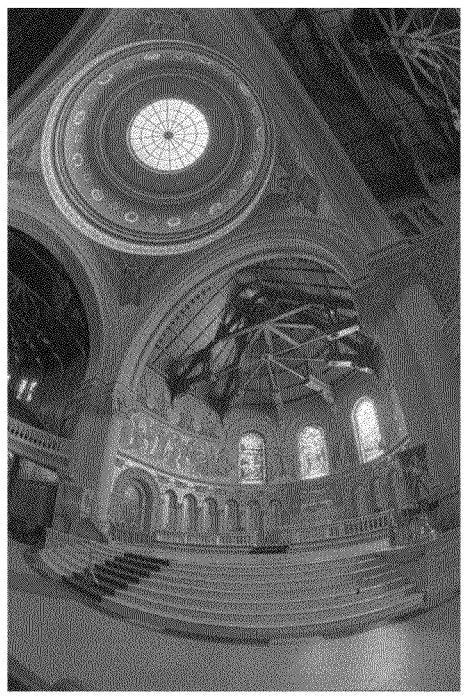
Figure 12A:
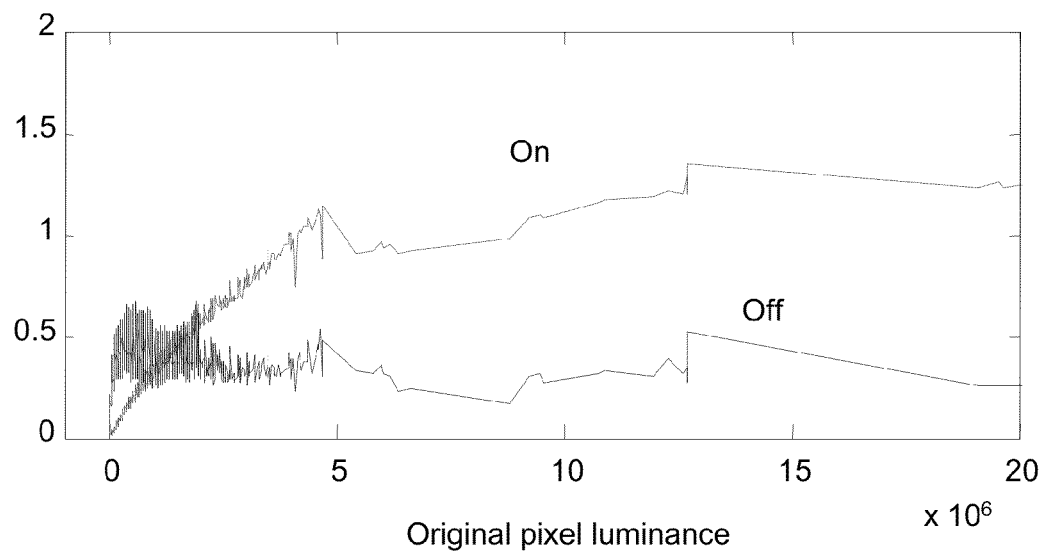
Figure 12B:
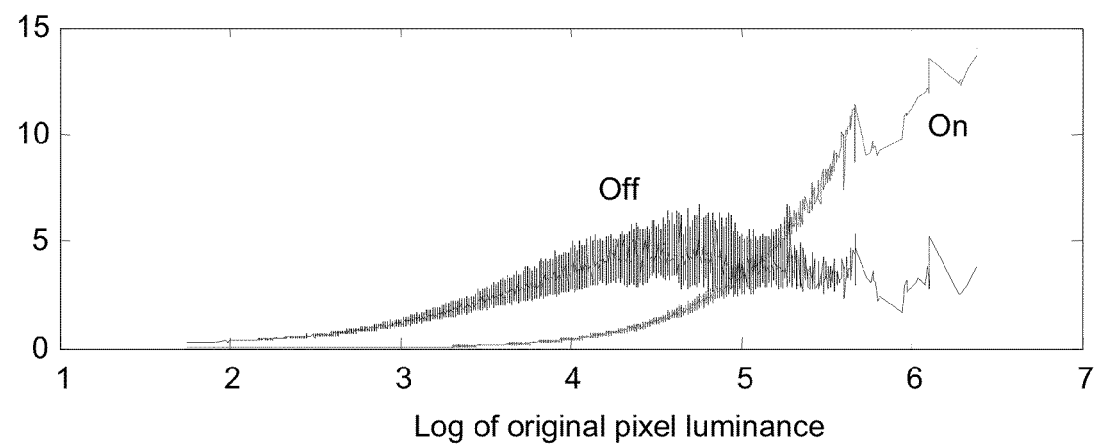
Figure 12C:
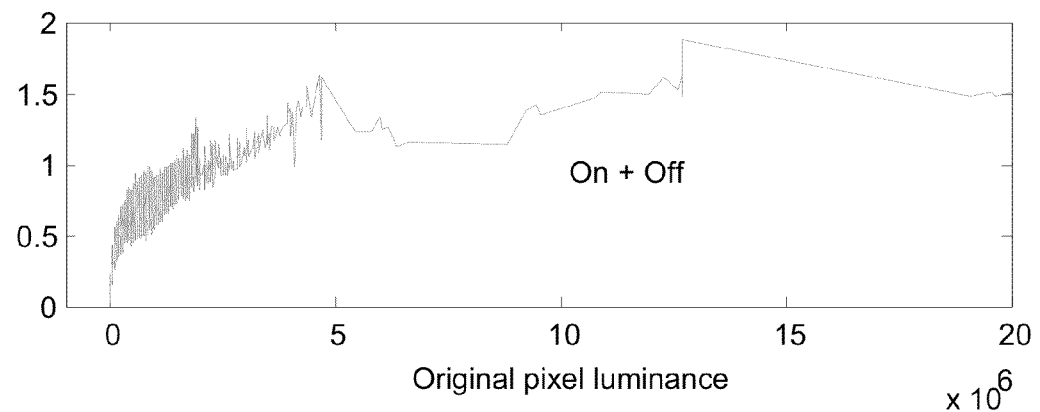
Figure 12D:
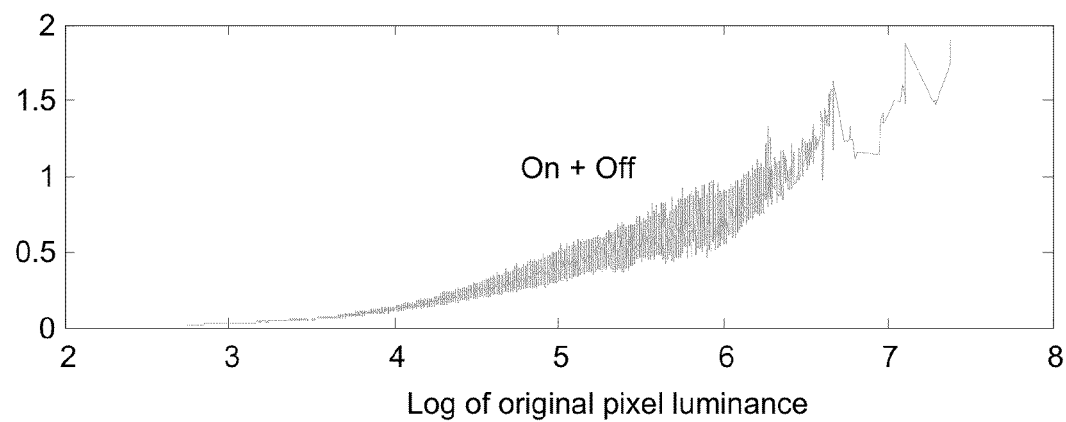
Figure 13A:
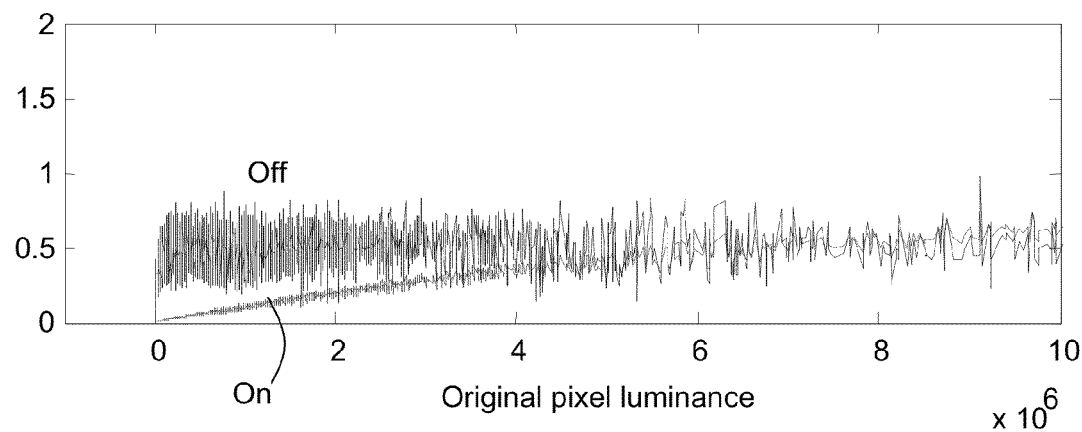
Figure 13B:
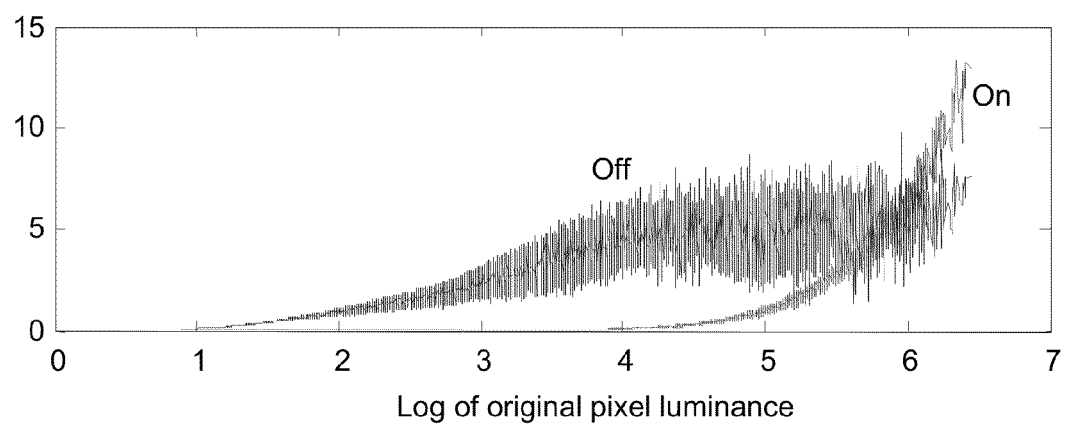
Figure 13C:
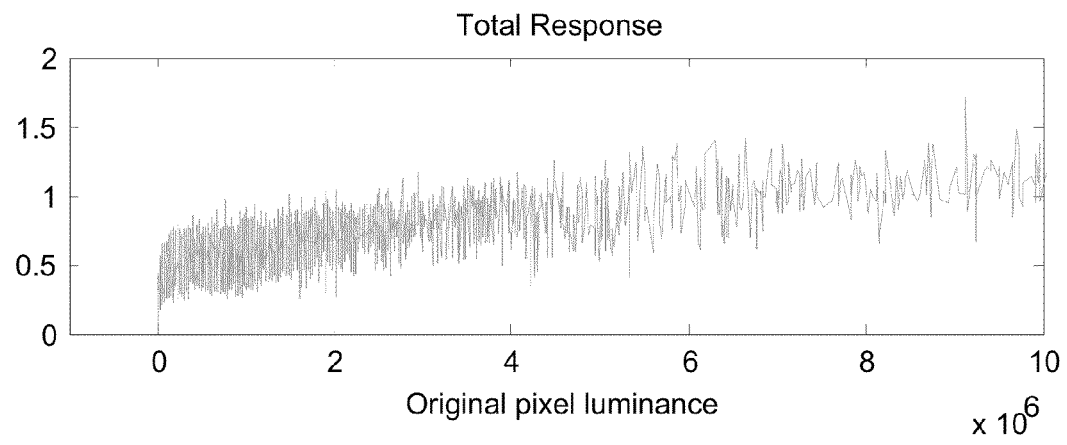
Figure 13D:
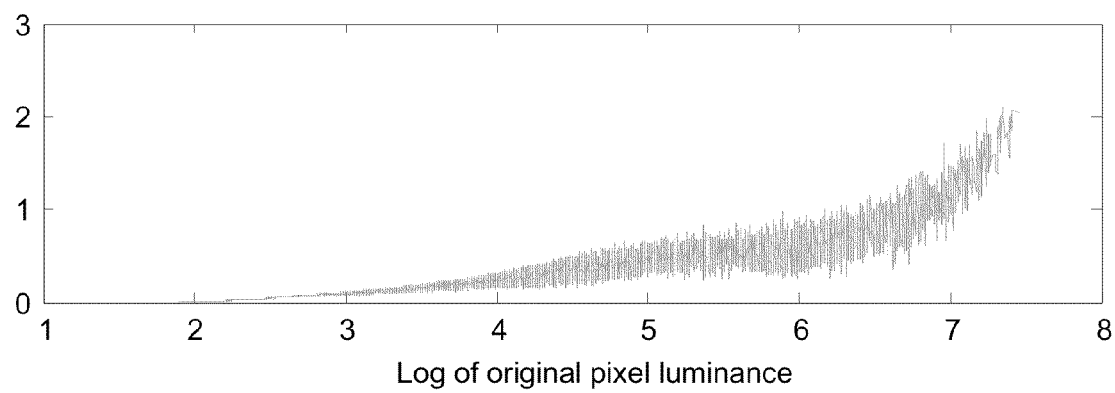

FIGS. 13A-D present intermediate (FIGS. 13A-B) and new (FIGS. 13C-D) intensity as a function of the luminance for the images of FIGS. 11A-C as calculated according to various exemplary embodiments of the present invention.

Figure 14A:
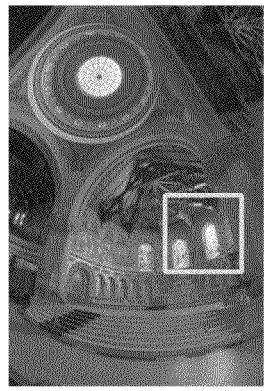
Figure 14B:
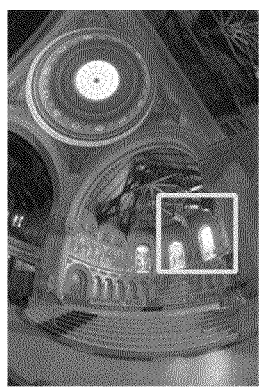
Figure 14C:
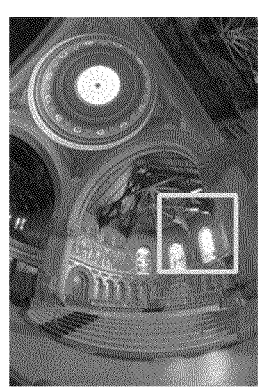
Figure 14D:
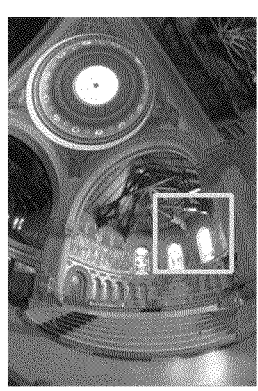
Figure 14E:
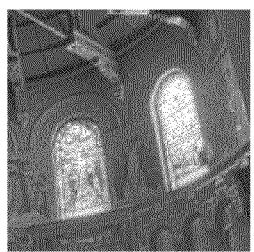
Figure 14F:
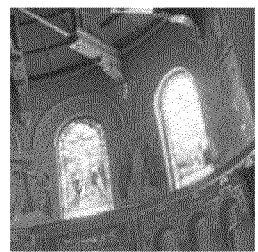
Figure 14G:
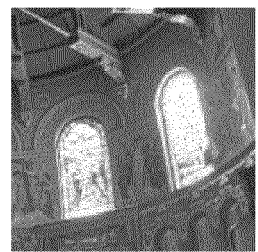
Figure 14H:
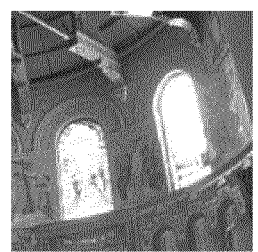
Figure 15A:
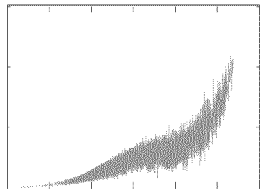
Figure 15B:
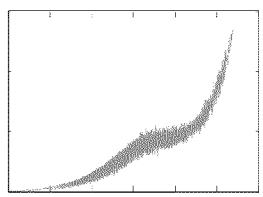
Figure 15C:
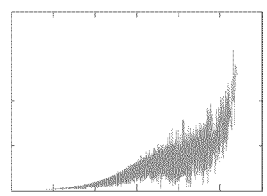
Figure 15D:
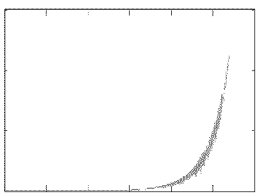
Figure 16A:
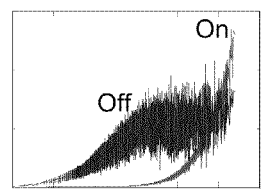
Figure 16B:
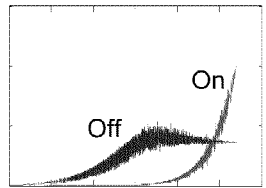
Figure 16C:
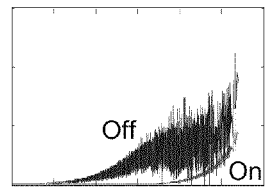
Figure 16D:
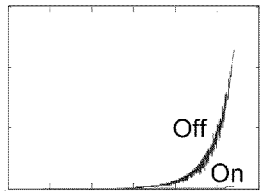

FIGS. 14A-D present images as processed using four different scenarios: with local and nonlocal adaptation (FIG. 14A), without nonlocal adaptation (FIG. 14B), without local adaptation (FIG. 14C), and without adaptation (FIG. 14D).

FIGS. 14E-H are enlarged views of marked squares in FIGS. 14A-D, respectively.

FIGS. 15A-D show new intensity levels as a function of the log of luminance for FIGS. 14A-D, respectively.

FIGS. 16A-D show intermediate intensity levels as a function of the log of luminance for FIGS. 17A-D, respectively.

Figure 17A:
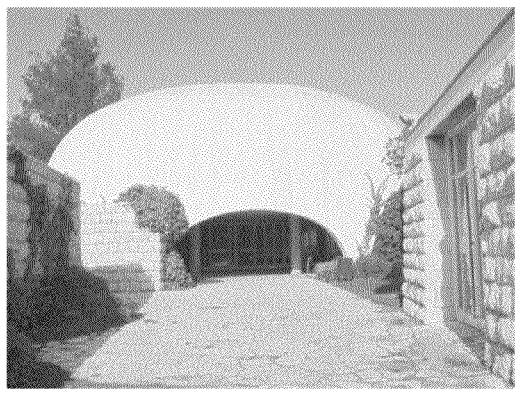
Figure 17B:
Figure 17C:
Figure 17D:
Figure 18A:
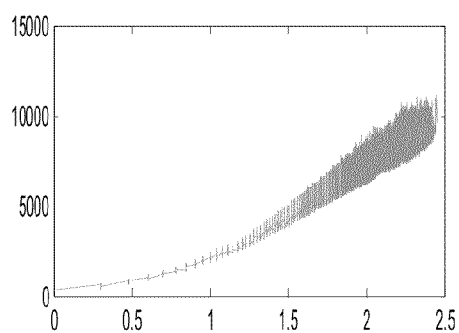
Figure 18B:
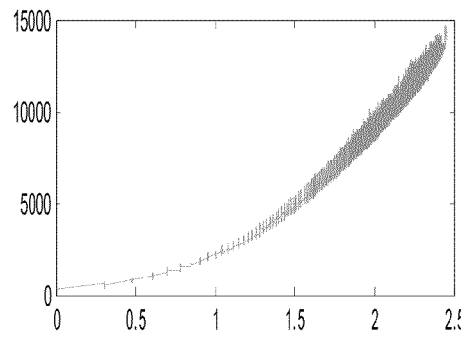
Figure 18C:
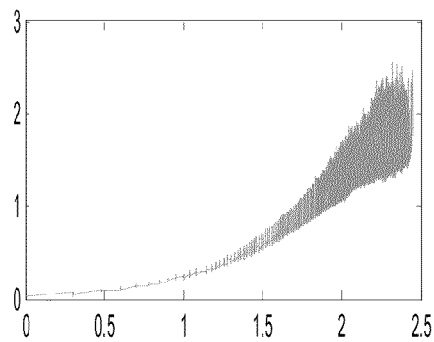
Figure 18D:
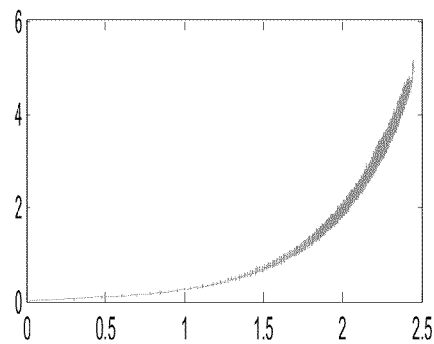
Figure 19A:
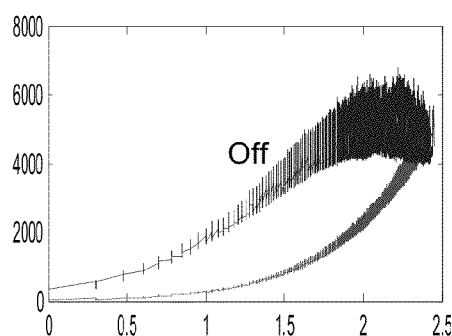
Figure 19B:
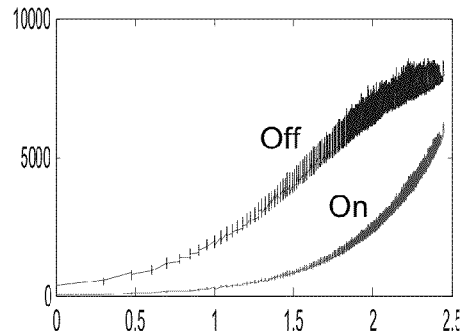
Figure 19C:
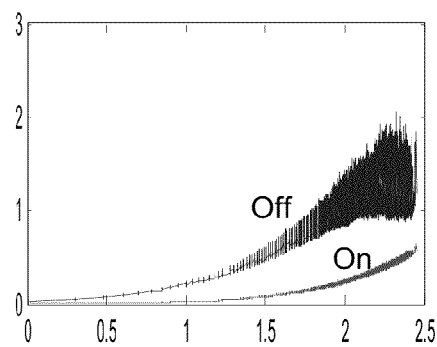
Figure 19D:
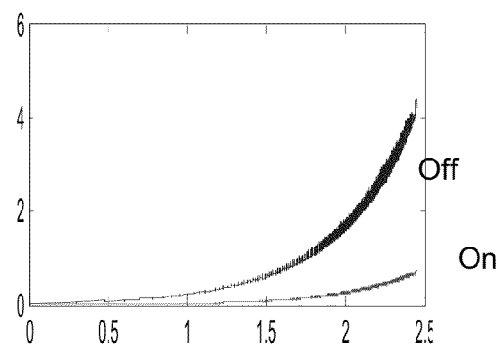

FIGS. 17A-D present additional images processed using four different scenarios: with local and nonlocal adaptation (FIG. 17A), without nonlocal adaptation (FIG. 17B), without local adaptation (FIG. 17C), and without adaptation (FIG. 17D).

FIGS. 18A-D show new intensity levels as a function of the log of luminance for FIGS. 14A-D, respectively.

FIGS. 19A-D show intermediate intensity levels as a function of the log of luminance for FIGS. 17A-D, respectively.

FIGS. 20A-D and FIGS. 21A-D present images obtained for different values of c' parameters introduced in Equation 6 and Table 1, below, where FIGS. 20A and 21A correspond to the values in Table 1 with the replacement c'→2c', FIGS. 20B and 21B correspond to the values in Table 1 without modification, FIGS. 20C and 21C correspond to the values in Table 1 with the replacement c'→0.5c', and FIGS. 20D and 21D correspond to the values in Table 1 with the replacement c'→0.

Figure 22A:
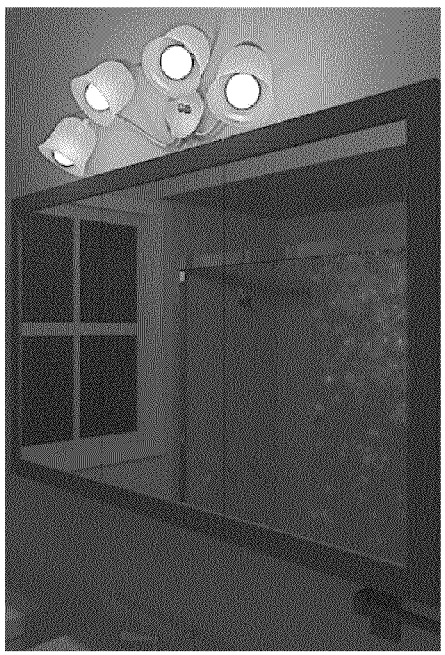
Figure 22B:
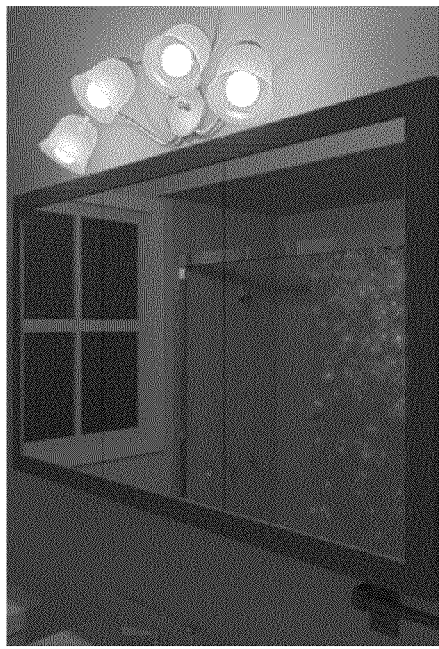

FIGS. 22A-B show an image obtained with (FIG. 22B) and without (FIG. 22A) the application of the halo artifact reduction procedure according to the exemplary embodiments formulated in Equations 12 and 13 below.

FIGS. 23A-D and 24A-H are images subjected to processing and post processing in accordance with preferred embodiments of the present invention.

DESCRIPTION OF EXEMPLARY EMBODIMENTS

The present embodiments comprise apparatus and method for processing an image. Specifically, the present embodiments can be used for providing an automatic dynamic range modulation of a digital image while maintaining or even improving its contrast. In various exemplary embodiments of the invention the method and/or apparatus is used for companding (compressing and expanding) a high dynamic range (HDR) image. The present embodiments further comprise an imaging device incorporating the apparatus.

Figure 1:
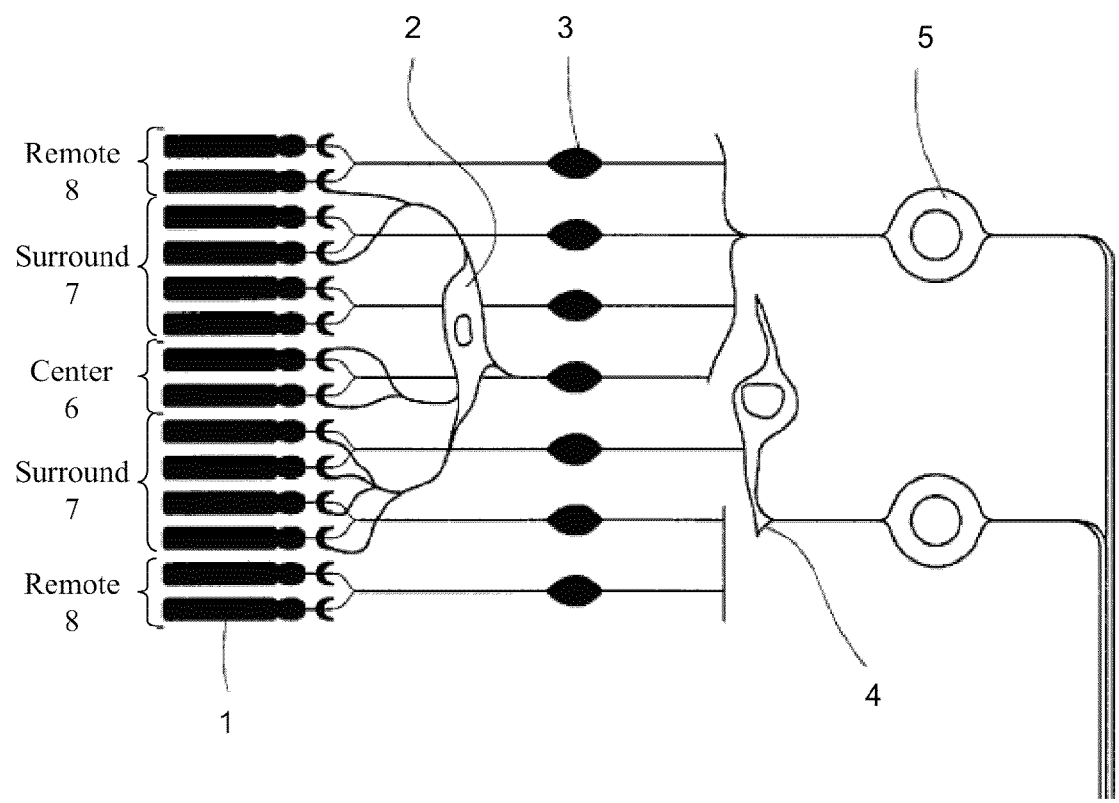

For purposes of better understanding the present invention, as illustrated in FIGS. 2-24 of the drawings, reference is first made to the human vision system as illustrated in FIG. 1.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 illustrates a schematic cross section of the human retina, showing that the retina consists of five layers of cells, receptors 1, horizontal cells 2, bipolar cells 3, amacrine cells 4, and retinal ganglion cells 5. Receptors 1 are stimulated by light and pass information to retinal ganglion cells 5, by a sequential series of biochemical and then electrical messages, through the intermediate layers of the retina.

Ganglion cells 5 are known to perform "gain control" operation, in which the response curve, rather than being a constant saturation curve, is dynamically shifted from one saturation curve to another, after a certain amount of illumination has been viewed, thus leading to a new adaptation state of ganglion cells 5 [R. Dahari and H. Spitzer, "Spatio-Temporal Adaptation Model for Retinal Ganglion Cells", *J. Opt. Soc. Am., A:*13, 419-439, 1996].

A known physiological phenomenon in the human vision system is the so called "induction phenomenon", according to which the perceived image, is not just a simple function of the stimulus from specific receptor cell, but rather a more complicated combination of other stimuli, originating from other receptors in the field of view.

Hence, for a specific ganglion cell, the indirect input of the cell includes both receptors 6 of the center receptive field area and receptors 7 of the nearby, referred to below as surrounding, receptive field area. The responses of the center area receptors and the surround area receptors are combined in the ganglion cell, in one of two different ways, depending on the type of the ganglion cell. An "on-center" ganglion cell responds positively to signals of increased light intensity from the center area of the receptive field and negatively to signals of increased light intensity from the surround area of the receptive field. An "off-center" ganglion cell responds negatively to signals of increased light intensity from the center area of the receptive field and positively to signals of increased light intensity from the surround area of the receptive field.

In addition, it is believed that the processing at the retinal ganglion cell level further includes influences of responses from receptors 8 being in a "remote" area of the receptive field that is even farther than the surround area from the center area.

U.S. Pat. Nos. 5,771,312 and 6,931,152 the contents of which are hereby incorporated by reference, disclose algorithms for partially correcting color images for colored illumination without knowledge of either the color or the intensity of the illumination. These algorithms exploit the above physiological mechanisms and phenomena of the visual system, to process the color channels of an image, thereby to achieve a "color constancy", in which the perceived color remains more constant and decouples from the spectral composition of the light reflected from it under varying colored illumination.

Unlike these algorithms, embodiments of the present invention are realized by operations on the achromatic channel of a digital image. It was uncovered by the present Inventors that the human vision principles of the achromatic retinal cells may be exploited to process the achromatic intensity levels of the image. It was demonstrated by the present Inventors that such processing can significantly improve the quality of the processed image.

Figure 2:
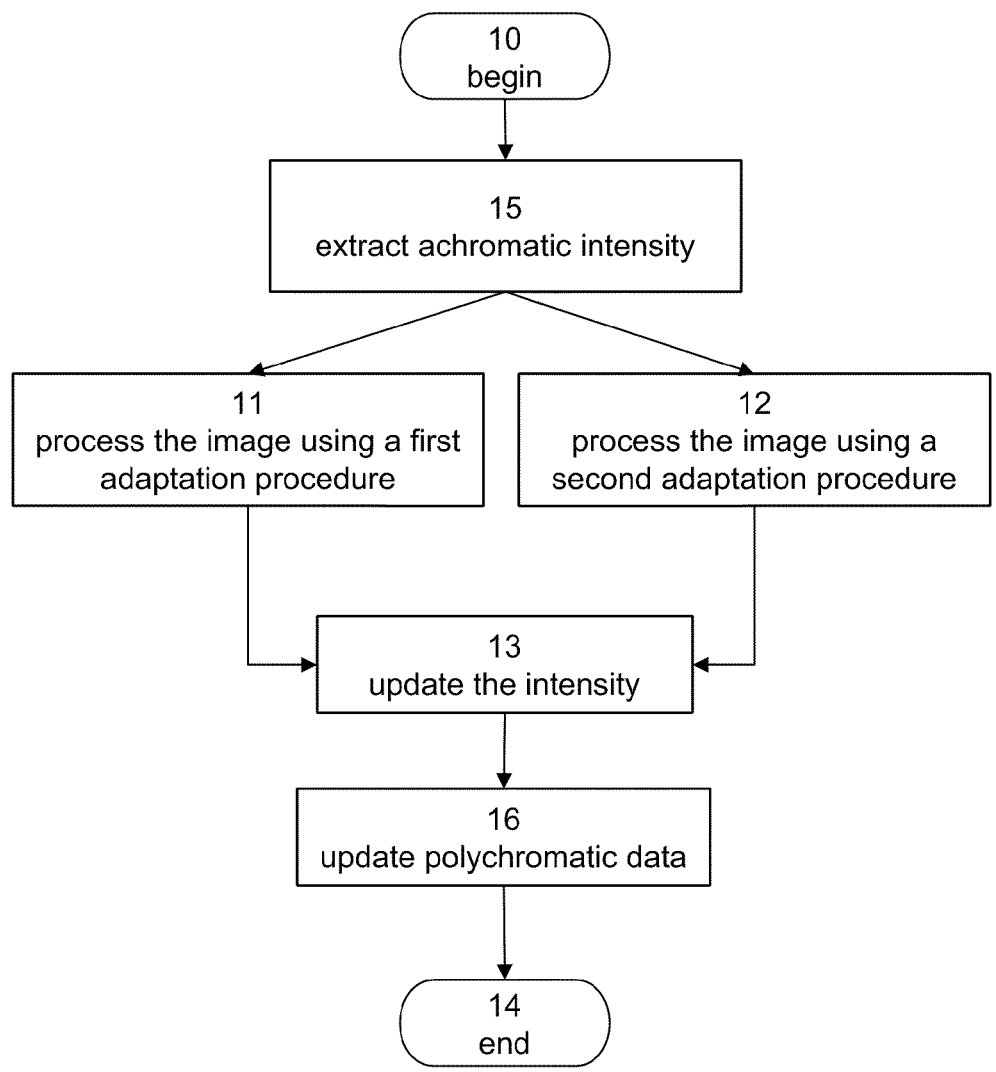

FIG. 2 is a flowchart diagram of a method suitable for method of processing a digital image according to various exemplary embodiments of the present invention.

It is to be understood that unless otherwise defined, the method steps described hereinbelow can be executed either contemporaneously or sequentially in many combinations or orders of execution. Specifically, the ordering of the flowchart diagrams is not to be considered as limiting. For example, two or more method steps, appearing in the following description or in the flowchart diagrams in a particular order, can be executed in a different order or substantially contemporaneously. Additionally, several method steps described below are optional and may not be executed.

The method can be embodied in many forms. For example, it can be embodied in on a tangible medium such as a computer for performing the method steps. It can be embodied on a computer readable medium, comprising computer readable instructions for carrying out the method steps. In can also be embodied in electronic device having digital computer capabilities arranged to run the computer program on the tangible medium or execute the instruction on a computer readable medium.

Computer programs implementing the method can commonly be distributed to users on a distribution medium such as, but not limited to, a floppy disk or CD-ROM. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

References to a "digital image" are references to values at picture-elements, treated collectively as an array. Thus, the term "image" or "digital image" includes mathematical objects, and does not necessarily correspond to a physical image, although the original input image and the resulting image after processing certainly correspond to physical images.

In what follows, the description of the method is directed to the data processing of an arbitrarily chosen picture element, generally referred to herein as element 20 (not shown in FIG. 2). It is to be understood that the method steps are preferably repeated independently for most or all the picture-elements of the digital image. The picture-element can be a pixel or a collection of pixels.

The method begins at step 10 and continues to step 11 in which the achromatic intensity level of picture element 20 is processed using a first adaptation procedure to provide a first intermediate intensity level, and step 12 in which the achromatic intensity level of picture element 20 is processed using a second adaptation procedure to provide a second intermediate intensity level.

In various exemplary embodiments of the invention the first adaptation procedure features a first effective saturation function of the achromatic intensity, and the second adaptation procedure features second effective saturation function of the achromatic intensity. The first effective saturation function is typically different from the second effective saturation function.

Representative examples of such functions are shown in FIGS. 3a-b, each depicting three "response curves", on a logarithmic scale. The curves are "response curves" in the sense that the abscissas represent the input achromatic intensity levels and the ordinates represent the intermediate intensity levels. Thus, the curves illustrate the manner by which the adaptation procedures of the present embodiments response to the input data. It is to be understood that the scales, values and/or number of response curves shown in FIG. 3a-b serve as representative examples and are not to be considered as limiting.

The solid lines in FIGS. 3a-b correspond to a low input level (e.g., dark picture-element in the original physical image), the dashed lines correspond to high input level (bright picture-element in the original physical image) and the dotted lines correspond to medium input level (fainter picture-element in the original physical image). In both FIGS. 3a and 3b, the response curve for bright input is lower than the response curve of dark or faint input. Thus, each of FIGS. 3a-b represents a monotonic function of the achromatic intensity. Yet, the response, e.g., to bright input is higher in FIG. 3a than in FIG. 3b.

It was found by the present inventors that such selection of the adaptation procedures mimics the operation of the physiological visual system. Specifically, the first and second adaptation procedures respectively mimic the "on" and "off" retinal pathways because the adaptation of "on-center" and "off-center" cell types is performed through different types of dynamical curve shifting.

The first and second adaptation procedures are also referred to herein as "On" and "Off" adaptation procedures, respectively, and the first and second intermediate intensity levels are denoted $R_{On}$ and $R_{Off}$, respectively.

One or more of the adaptation procedures can comprise a positive contribution calculated using a central saturation function, and a negative contribution calculated using a peripheral saturation function. The combination of the saturation functions for each adaptation procedure results in the effective saturation function according to which the intermediate intensity levels are obtained. Representative examples of curves describing such effective saturation functions are illustrated in the Examples section that follows (see FIG. 8). In various exemplary embodiments of the invention the central saturation function is different from the peripheral saturation function. This can be done, for example, by defining, for each picture-element being processed, a surrounding region and a remote region, thus mimicking the aforementioned physiological adaptation mechanism of the human visual system.

In some embodiments, an additional region, a center region of picture elements, is also defined. The center region may comprise element 20 and picture elements immediately adjacent to element 20. Alternatively, the center region may be a single element region, hence comprising only element 20. This alternative coincides with the embodiment in which no center region is selected.

The concept of the center, surround and remote regions may be better understood from the following example, with reference to FIG. 3c. Suppose that the picture elements of the image are arranged in a rectangular grid 30. The center region can be a single picture element (element 20), the surround region may be a group of picture elements 32 immediately surrounding picture elements 20 and the remote region may be a group of picture elements 34 immediately surrounding the surround region. Preferably, but not obligatorily, there is no overlap between the center, surround and remote regions. Other definitions for the center, surround and remote regions are not excluded from the present invention, both for a rectangular grid or for any other arrangement of the picture elements.

The central saturation function can be calculated using the achromatic intensity of element 20 (or the integrated achromatic intensity over the elements in the center region in the embodiments in which such region includes more than one picture-element). The peripheral can be calculated using the integrated achromatic intensity of the picture-elements in the surrounding region. In various exemplary embodiments of the invention the saturation functions include some contribution from non-local picture-elements. For example, a saturation function can have the form $G/(G+\sigma)$, where G is a function of the local achromatic intensity and $\sigma$ is an adaptation function having a local term and a nonlocal term. For the central saturation function, G can be a function of the intensity in the center region and $\sigma$ can be a function of the intensity in the center region as well as the intensity in the remote and/or surrounding region. For the peripheral saturation function, G can be a function of the intensity in the surrounding region and $\sigma$ can be a function of the intensity in the surrounding region as well as the intensity in the remote region.

Mathematical formulations of saturation functions and adaptation functions according to various exemplary embodiments of the present invention are provided hereinunder.

Once the intermediate intensity levels $R_{On}$ and $R_{Off}$ are obtained, the method continues to step 13 in which $R_{On}$ and $R_{Off}$ are combined to provide a new achromatic intensity level R, which is then associated with picture-element 20. Thus, steps 11-13 are directed to replace the intensity level of element 20 with a new intensity level. The new achromatic intensity level is typically a linear combination of the intermediate intensity levels. For example, the new level can be a sum or a weighted sum of the intermediate levels.

The above process of assigning the new intensity level, R is repeated for most or all the picture elements. Thus, the entire image is assigned with the new intensity level. The above operations may be employed contemporaneously for more than one picture element, e.g., using a parallel processor. One or more of the above operations may also be applied sequentially on more than one picture element, before the next operation starts. For example, the overall regional intensities, $G_r$, and/or the intermediate intensities $R_{On}$ and $R_{Off}$ may be the calculated for more than one picture element and then stored in an addressable memory medium, so that it may be reused for further calculations.

Once the picture-elements are assigned with new intensity levels, the image can be realized using an image forming device, such as, but not limited to, a display device (e.g., a monitor), a printer and a projector.

The present embodiments are particularly useful for modulating the dynamic range of the image. Specifically, the input to the method is an image which is characterized by a first dynamic range and the output is a new image which is characterized by a second dynamic range.

The second dynamic range is preferably selected so as to optimize the resultant image and substantially reduce information loses while outputting the image to the image forming device. The second dynamic range depends, inter alia, on the type of the image forming device, the first (the original) dynamic range, the existence or non existence of extreme light conditions and the like. For example, for an image which is characterized by a dynamic range of many orders of magnitude (e.g., five orders of magnitude or more) the second dynamic range may be smaller than the first dynamic range, so as to comply with the limitation of the image forming device being in use; for a standard RGB image, the second dynamic range of the entire image may be the same is the first dynamic range, however, for specific regions of the image, e.g., regions subjected to extreme light conditions, the second dynamic range may be larger, smaller, or shifted relative to the original dynamic range. In any case, as further detailed hereinbelow and demonstrated in the Examples section that follows, the embodiments of the present invention provide a well define prescription of calculating an appropriate value for the new intensity level so as to significantly improve the image.

In various exemplary embodiments of the invention the steps are adapted for reducing the dynamic range of the digital image by at least 5, more preferably 6, more preferably 7, more preferably 8, more preferably 9, e.g., 10 orders of magnitude or more.

The method ends at step 14.

The method of the present embodiments as described above, may include one or more optional steps, depending on the application for which the is employed and the type of input digital image.

For example, in some embodiments of the present invention, the input information associated with the picture-element is more complex. In this embodiments steps 11 and 12 are preceded by an optional step 15 in which the achromatic intensity level is extracted. The extraction depends on the type of the input information. Typically, the picture element is associated with polychromatic data, and the achromatic intensity level is extracted from the polychromatic data.

Ideally, the polychromatic data is the spectrum of a scene as a function of wavelength. This ideal input rarely is attainable in practical systems. Therefore, the scope of the present invention contemplates the processing of images obtained by other means. For example, the polychromatic data may be a plurality of digital signals, such as those acquired by, for example, still or video cameras. In this case, the polychromatic data may be realized in any known format, provided that the achromatic intensity levels of the picture elements are extractable from this format. Preferably, the achromatic intensity level is extracted by transforming the image information format to a coordinate-system having an achromatic intensity component and setting the achromatic intensity level to be the intensity component. For example, if the image information is in the RGB format, then, one way to extract the image information is first to transform the RGB format to an CIE XYZ coordinate-system and then to set the intensity level to be the Y component of the CIE XYZ coordinate-system. Additionally, the CIE XYZ coordinate-system may be transformed to a CIE xyz coordinate-system. The transformation from RGB coordinate-system, to CIE XYZ coordinate-system may be found, for example, in G. Wyszecki and W. S. Styles, "Color Science" (Wiley, 1982), pages 139 and 615, the contents of which are hereby incorporated by reference.

According to a preferred embodiment of the present invention a copy of the polychromatic data is stored in a memory for the purpose of reconstructing the original format, once the processing of the image is completed. Once the intensity level of element 20 is replaced with the new intensity level, the methods can continues to optional step 16 in which the polychromatic data is restored. For example, the new achromatic intensity level of element 20 can be combined with the polychromatic data of element 20 and transformed backwards to the original color coordinate-system so as to provide new polychromatic data.

In some embodiments of the present invention, the method further comprises an optional step of redefining the intensity level of element 20 using a preliminary saturation function, thereby modeling the response of the retinal receptive fields to the input stimuli. Any saturation function may be used for this purpose, such as, but not limited to, the Naka-Rushton saturation function or a modification thereof [K. I. Naka and W. A. H. Rushton, "S-Potentials From Color Units in the Retina of Fish", *J. Physiol.* 185:536-555, 1966; R. A. Normann et al., "Cone Photoreceptor Physiology and Cone Contribution to Color Vision", Gouras P., Ed., The Perception of Color, 146-162, MacMillen Press, London, 1991, R. Dahari and H. Spitzer, ibid]. The mathematical realization of this step is further detailed hereinafter.

The mathematical formulation of the method, as delineated hereinabove will now be provided.

Hence, as stated, the intensity level of element 20 is preferably redefined using a saturation function. Denoting the intensity level of element 20 by I, the redefinition of I may be in accordance with the following Naka-Rushton equation:

$$I := I^n / (I^n + \sigma_{NR}^n) \quad \text{(EQ. 1)}$$

where, n and $\sigma_{NR}$ are Naka-Rushton exponent and saturation constant, respectively, and the ":=" symbol represents redefinition. A typical value for n is from 1 to 4 and a typical value for $\sigma_{NR}$ is about 250 cd/m².

As used herein, the term about refers to ±10%.

Once the surround, the remote and optionally the center regions are defined, the intensities of the picture elements in each region are preferably used for calculating, for each region, an overall regional intensity, $G_r$, where the subscript "r" is to be understood as a regional subscript. Specifically, for the center region r should be replaced by the subscript "center" or "cen", for the surrounding region r should be replaced by the subscript "surround" or "srnd", and for the remote region r should be replaced by the subscript "remote" or "rem".

According to a preferred embodiment of the present invention the overall intensity may be calculated using a regional spatial profile, $f_r$. More preferably, the overall intensity is calculated as an inner product of the intensity of the picture elements in each region with the respective regional spatial profile. Mathematically this inner product is realized by the following equation:

$$G_r = \int I f_r \, ds \quad \text{(EQ. 2)}$$

where ds is an area integration measure, which is selected in accordance with the arrangement of the inputted picture elements, e.g., for a rectangular x-y grid-like arrangement ds equals dx dy. The area of integration of Equation 2 depends on the regional subscript, r. Representative examples for regional profiles are illustrated in FIG. 7 of the Examples section that follows. As a more specific example, in the "On" adaptation procedure, the integration area for the overall center intensity, $G_{cen}$, typically extends over one picture element (element 20), the integration area for the overall surround intensity $G_{srnd}$ typically extends over eight picture elements immediately surrounding element 20 (see FIG. 3), but may include the 16 picture elements immediately surrounding those eight picture elements, thereby extending over a total of 24 picture elements, and the integration area for the overall remote intensity $G_{rem}$ typically extends over a 0.1-10% of the image, but may extend over as few as the 24 picture elements that are preferably the maximum for the surrounding region. For example, a typical remote integration area for a 400×400 image can be an annulus surrounding element 20 with an inner radius of 9 picture-element and an outer radius of 18 picture elements. At the boundaries of the images, all the integrations preferably facilitate periodic boundary conditions.

A known phenomenon in the field of image-processing is the appearance of halo artifacts, surrounding the imaged objects. The halo artifacts are typically formed near edges of large contrast, and can be explained mathematically as originated from large intensity derivatives at the respective picture elements. The present invention, in a preferred embodiment, successfully provides a procedure for substantially reducing or eliminating halo artifacts. The procedure of halo artifacts reduction/elimination preferably comprises a halo-test, performed so as to determine a possible contribution of the respective picture element to a formation of a halo artifact. According to a preferred embodiment of the present invention, a picture element in which the intensity level is substantially different than the intensity level of element 20 is defined as a contributor to a formation of halo artifact. For example, if the difference between the intensity level of element 20 and intensity level of a particular picture element is above a predetermined threshold, then the particular picture element is defined as contributor to a formation of halo artifact. It is to be understood that any mathematical procedure, other than a difference, between the intensity levels may also be employed in the halo-test.

The halo-test is performed, preferably on each picture-element of the image, more preferably on each picture-element in the regions other than the center region, and most preferably on each picture-element in the remote region.

Once the halo-test is performed, the procedure of eliminating the halo artifacts can be executed as follows: let p be a picture element which has been defined in the halo-test as a contributor to a formation of halo artifact. Then, for the purpose of calculating the overall intensity, the intensity level of p is preferably replaced with a new, predetermined, intensity level. The predetermined intensity level is not limited and may be, for example, a constant, a function of the intensity level of element 20, an average intensity level and the like. According to a preferred embodiment of the present invention, once the calculation of the overall regional intensities is completed, the original value of p is restored.

An alternative procedure for eliminating the halo artifacts may also be performed. In this alternative, the sizes of the center, surrounding and/or remote regions preferably depend on whether a contributor to a formation of halo artifact has been defined in the respective region. More particularly regions with no contributors to a formation of halo artifact are larger than regions in which one or more such contributors were found in the halo-test.

The regional spatial profiles, $f_r$, used for calculating the overall regional intensities are preferably spatial decaying functions, with may have different forms, depending on the region in which the profiles are applied. Examples for the specific form of each regional spatial profile include, but are not limited to, a Gaussian, an exponent, a Lorenzian, a modified Bessel function and a power-decaying function. These function are typically characterized by a slope, denoted $K_r$ (r="center" or "cen", "surround" or "srnd", "remote" or "rem"), which may be different for each region.

Preferably, the regional spatial profiles, $f_r$, and more preferably the remote spatial profile, may be constructed so as to reduce halo-artifacts, for example by selecting an appropriate width thereto. Specifically, narrow remote spatial profile is selected when one or more contributors to a formation of halo were detected in the halo-test, and wide remote spatial profile is selected when no such contributor was detected. In other words, large overall intensities correspond to narrow regional spatial profiles and low overall intensities correspond to wide remote spatial profile.

Each adaptation procedure preferably adapts the overall center intensity using the overall surround intensity and the overall remote intensity. This may be done, for example, by calculating, for each adaptation procedure, a central saturation function $R_c$ and a peripheral saturation function $R_p$.

Since the present invention contemplates a plurality of adaptation procedures, there is more than one central saturation function and more than one different peripheral saturation function. Thus, for example, for two adaptation procedures ("On" and "Off") there are two central saturation functions $R_{c,On}$ and $R_{c,Off}$, and two peripheral saturation functions $R_{p,On}$ and $R_{p,Off}$. Preferably, $R_{c,On}$ differ from $R_{c,Off}$ and $R_{p,On}$ differ from $R_{p,Off}$. Preferred expressions for the saturation functions are:

$$R_{c,On} = \frac{d_{c,On} G_{cen}}{G_{cen} + \sigma_{cen,On}}$$

$$R_{c,Off} = \frac{d_{c,Off} G_{cen}}{G_{cen} + \sigma_{cen,Off}}$$

$$R_{p,On} = \frac{d_{c,On} G_{srnd}}{G_{srnd} + \sigma_{srnd,On}}$$

$$R_{p,Off} = \frac{d_{c,Off} G_{srnd}}{G_{srnd} + \sigma_{srnd,Off}}$$

(EQ. 3)

where $d_{c,On}$, $d_{c,Off}$, $d_{s,On}$ and $d_{s,Off}$ are coefficients defining the weight of each saturation function, and $\sigma_{cen,On}$, $\sigma_{cen,Off}$, $\nu_{srnd,On}$ and $\sigma_{srnd,Off}$ are adaptation functions for $G_{cen}$ and $G_{srnd}$ in the "On" and "Off" adaptation procedure, respectively.

In each adaptation procedure, $\sigma_{cen}$ and $\sigma_{srnd}$ preferably comprise a local term to account for the influence of the intensity in the respective local region, and a nonlocal term to account for the influence of the intensity in other region or regions. This can be mathematically expressed as:

$$\sigma_{r,j} = \sigma(\text{local})_{r,j} + \sigma(\text{nonlocal})_{r,j},$$ (EQ. 4)

where r is a regional index (r="cen", "srnd") and j is a procedural index (j="On", "Off").

The following embodiments are suitable (with judicious selection of parameters) for all the adaptation procedures. For clarity of presentation the procedural subscript j is omitted from the following description. One of ordinary skills in the art, provided with the details described herein would know how to adjust the notations for the individual procedures.

$\sigma(\text{local})_r$ and $\sigma(\text{nonlocal})_r$ typically set the relative weight of the nonlocal regions on each adaptation function, and are preferably functions of the regional overall intensity. The local parts are preferably calculated as linear functions of the regional overall intensities (with either constant or variable coefficients). The nonlocal parts are preferably calculated using adaptation weight-functions.

Several adaptation weight-functions may be defined. For example, in one embodiment, two adaptation weight-functions are defined for modulating achromatic intensities in the center and surrounding regions due to the intensities in the remote region. In this embodiment, the adaptation weight-functions are termed a "center-nonlocal" adaptation weight-function and a "surround-nonlocal" adaptation weight-function, respectively. Other adaptation weight-functions for other combination of regions are not excluded from the scope of the present invention.

In various exemplary embodiments of the invention a $\sigma_{cen}$ and $\sigma_{srnd}$ are calculated according to the following equations (note that the regional index, r, is used in Equation 5 only for center or surround):

$$\sigma_r = \alpha_r G_r + \beta_r + c_r G_{rem},$$ (EQ. 5)

where $\alpha_r$ and $\beta_r$ are the coefficients of the local parts of the adaptation functions, and $c_r$ are the adaptation weight functions ($c_{cen}$ being the "center-nonlocal" adaptation weight-function and $c_{srnd}$ being the "surround-nonlocal" adaptation weight-function). The coefficients $\alpha_r$ and $\beta_r$ may be either constant or variables. Preferably, the value of these coefficients may be chosen in accordance with the dynamic range of the image which is inputted. For example, a first set of coefficient may be selected for a dynamic range of 2 orders of magnitude or below and a second set of coefficient may be selected for a dynamic range of above 2 orders of magnitude. More sets of coefficients for other dynamic ranges are also not excluded from the present invention. A typical numerical value for $\alpha_r$ is from about 0.1 to about 1.0, and typical numerical value for $\beta_r$ is from about 10 and 1000.

The coefficients $\alpha_r$ and $\beta_r$ may also be used for the purpose of reducing halo-artifacts. It has been found by the inventors of the present invention that the halo-formation phenomenon is more sensitive to the value of $\beta_r$ than to the value of $\alpha_r$. Hence, according to some embodiments of the present invention the value of $\beta_r$ is selected as a function of the relations between the overall intensities, for example, as a function of $G_{rem} - G_{srnd}$, or as a function of the $G_{cen} - 0.5(G_{rem} - G_{srnd})$, or any other suitable combination of two or more overall intensities. It is to be understood, however, that it is not intended to limit the scope of the present invention to use only $\beta_r$ in the above procedure of reducing/eliminating halo artifacts. Thus, in another embodiment $\alpha_r$ may also be a function of the overall intensities as further detailed hereinabove.

Although the coefficients of Equation 5 are mathematical coefficients, they are preferably based on electro-physiological findings. In accordance with the above physiological "gain control", each of the center and surround adaptation function independently characterizes a dynamical intensity curve. The coefficients $\alpha_r$ are thus determine the degree of curve-shifting, for example, higher values of $\alpha_r$ lead to higher shifting amount of the response curve. The combination between $\alpha_r$ and $\beta_r$ determine the onset of the gain-control mechanism, hence $\alpha_r$ and $\beta_r$ serve as gain thresholds.

As can be seen form Equation 5, the center-nonlocal and surround-nonlocal terms $c_{cen} G_{rem}$ and $c_{srnd} G_{rem}$, respectively, are defined as a multiplication between the center-nonlocal and surround-nonlocal adaptation weight-functions and the overall remote intensity. The number of adaptation weight-functions may vary and the fact that Equation 5 includes two adaptation weight-functions is to be understood as a non-limiting example. Hence, the adaptation weight-functions modulate the adaptation in accordance with the intensity levels of picture elements in the remote region. A particular feature of the adaptation weight-functions is that these functions serve also for preserving and/or improving the contrast of the image, in a manner that will be now described.

Hence, at the vicinity of element 20, a local-contrast is preferably defined as the difference between the intensity level of element 20 and the picture elements of the surrounding region, where a large difference is interpreted as a higher local-contrast and a low difference is interpreted as a lower local-contrast. This difference may be calculated by more than one way, for example, by subtraction, division, subtraction of logarithms, discrete differentiation, discrete logarithmic differentiation or any other suitable mathematical operation between intensity levels. The adaptation weight functions are selected in accordance with the local-contrast calculations. Specifically, in regions in which the local-contrast is high these functions have small numerical values and in regions in which the local-contrast is low these functions have higher numerical values. An additional fine tuning may also be achieved in the embodiments in which there are two adaptation weight functions, where the value of each adaptation weight function may be selected independently.

In various exemplary embodiments of the invention the adaptation weight functions have the form $c'[k_1-(G_{cen}-G_{srnd})]$ where, c' is a constant and $k_1$ is a function of, e.g., a local or a global value of intensity. For example, in one embodiment, $k_1$ may be a function of the maximal and minimal intensities of the image, $I_{max}$ and $I_{min}$; in another embodiment $k_1$ may be a function of a maximal intensity of a region which includes element 20; and in an additional embodiment $k_1$ may be a function of some average intensity value (e.g., local or global average).

In some embodiments of the present invention the center-nonlocal adaptation weight-function $c_{cen}$, and the surround-nonlocal adaptation weight-function $c_{srnd}$, adaptation weight functions are:

$$c_{cen}=c'_{cen}[\log(I_{max}/I_{min})+m\log(1+m_1G_{cen})-|\log(G_{cen}/G_{srnd})|$$

$$c_{srnd}=c'_{srnd}[0.5*\log(I_{max}/I_{min})+m\log(1+m_1G_{srnd})-|\log(G_{cen}/G_{srnd})|$$ (EQ. 6)

According to a preferred embodiment of the present invention, time variation of the above intensities and functions may also be considered. This is particularly useful, for example, when the method is applied to digital video photography, where the intensity level of element 20 and other picture elements vary with time. In this embodiment the overall regional intensities, $G_r$, which become a function of time, t, are preferably redefined in the following manner.

Hence, in addition to the regional spatial profiles, $f_r$, which are applied to the respective region (center, surrounding or remote) at a single value of t, several low-pass temporal filters are applied on the overall (time-dependent) regional intensities, $G_r$. Each adaptive low-pass temporal filter may be, for example, a decaying function being dependent both on time, t, and on the prior history of the overall regional intensity to which temporal filter is applied.

According to a preferred embodiment of the present invention, the redefinition of the regional overall intensities is performed by convoluting (i) the overall center intensity with a first low-pass temporal filter, $Q_1$; (ii) the overall surround intensity with a second low-pass temporal filter, $Q_2$; and (iii) the overall remote intensity with a third low-pass temporal filter, $Q_3$.

In this embodiment, the first the second and the third adaptive low-pass temporal filter are realized, as the following functions:

$$Q_i(t)=(1/\tau_i(t))\exp(-t/\tau_i), i=1, 2, 3$$ (EQ. 7)

where $\tau_i(t)$ are a first, a second and a third time-dependent decay durations and $\tau_i$ are respective time parameters, which may be constants or variables. Typical values for the time parameters are about 250 milliseconds. What makes the $Q_i$ adaptive is that their associated decay duration, $\tau_i(t)$, have explicit dependence on both time and the prior histories of $G_r$. As known from physiological phenomena, the rate of the adaptation has a mild change as a function of signal magnitude, which rate may practically be considered as independent on signal magnitude. Hence, emulating the physiological process by applying a variable dynamic temporal filter on the processed function may diminish the dependence of the rate of the adaptation on signal magnitude. In other words, the low-pass temporal filters are selected so that, irrespectively of the acquired intensities of each of the successive images, a steady state is obtained within a predetermined and substantially constant time interval. The preferred form of the decay durations $\tau_i(t)$ is:

$$\tau_i(t)=\tau_{i,m}/(1+|G'_r(t)-G_r(t)|/G_n)$$ (EQ. 8)

where, $\tau_{i,m}$ are the maximal expected values of $\tau_i(t)$, $G_n$ is a normalization constant, and $G'_r(t)$ is the overall regional intensity, prior to its convolution with $Q_i$. In Equation 8, the indices should be respectively understood, i.e., for i=1, r="center", for i=2, r="surround" and for i=3, r="remote". A typical value of $\tau_{i,m}$ is about 500 milliseconds.

It is stressed that despite being defined in terms of their own output, the overall regional intensities are mathematically well-defined because of the causal definition. Specifically, the overall regional intensities are computed as:

$$G_r(t)=\int G_i(t')Q_i(t-t')dt', \text{ where } 0<t'<t.$$ (EQ. 9)

According to a preferred embodiment of the present invention, the low-pass temporal filters, $Q_i$ (i=1, 2, 3) and, in particular the time parameters $\tau_i$ may also be used for the purpose of reducing/eliminating halo artifacts. Specifically, any one of the time parameters $\tau_i$, preferably $\tau_3$, is selected as a predetermined function of a combination between the overall intensities, as further detailed hereinabove with respect to the coefficients $\alpha_r$ and $\beta_r$ (see Equation 5 and the discussion which follows).

Whether or not the overall regional intensities were redefined according to the above procedure (using either time-dependent or static functions), and whether or not the low-pass temporal filters were used for reducing/eliminating halo artifacts, the intermediate intensity levels are calculated using the above-mentioned saturation function and facilitating the center adaptation function $\sigma_{cen}$ and the surround adaptation function $\sigma_{srnd}$ as further detailed hereinabove.

According to a preferred embodiment of the present invention the intermediate intensity levels $R_{On}$ and $R_{Off}$ are calculated using the following equations:

$$R_{On}=R_{c,On}-R_{p,On}$$

$$R_{Off}=R_{c,Off}-R_{p,Off}$$ (EQ. 10)

The new achromatic intensity R can be calculated, as stated, as a linear combination of $R_{On}$ and $R_{Off}$, e.g., $$R=R_{On}+R_{Off}$$ (EQ. 11)

One immediate advantage of the dynamical property of, $G_r$, hence of the new intensity level through the saturation function, is the applicability to video photography. Thus, when a constant image is viewed over a certain duration its dynamic range appearance improves as a function of time, much like the behavior of the visual system.

For a single static image, the dynamical property of $G_r$ may be exploited using steady state values for $G_r$. Formally, this may be done by substituting t=∞ in the respective time-dependent expressions (see Equation 7, Equation 8 and Equation 9). One would appreciate that such a procedure results in an optimal dynamic range appearance and therefore in an improved quality of an image.

Reference is now made to FIG. 4A, showing a plurality of intensity curves, having a logarithmic stimulus scale. In FIG. 4A, the stimuli are measured in $cd/m^2$ and the responses are normalized and dimensionless. It is to be understood that FIG. 4A is given merely an example and that other scales and dimensions are not excluded from the scope of the present invention. The curve shifting operation is demonstrated with two highlighted curves in FIG. 4A, one at t=0 and one at t=∞. As shown, for a stimulus of about 500 $cd/m^2$ the response at t=0 almost reaches its maximal value of unity, whereas at t=∞ the response is reduced by about 70%, thereby allowing for much wider dynamic ranged to be processed.

The effect of curve-shifting on the adaptation procedure of the present embodiments is illustrated in FIG. 4B. Points A and B on the intensity curves in FIG. 4A respectively correspond to points A and B on the decaying function of FIG. 4B. A stimulus (stepped line in FIG. 4B) causes an abrupt increase in the response. The adaptation procedure results in a decay of the response as a function of time. The dashed line in FIG. 4B illustrates the temporal behavior of the curve-shifting.

Reference is now made to FIG. 5, which is a schematic illustration of an apparatus 50, for processing a digital image, according to various exemplary embodiments of the present invention. Apparatus 50 can be used for executing selected steps of the method described above. For example, apparatus 50 can be implemented in or supplemented to a data processor so as to allow the execution of one or more of the method steps.

Apparatus 50 receives the digital image (e.g., via an input unit 54) typically in a form of an array of picture-elements as described above. The apparatus can receive the achromatic intensities of the picture-elements, or, alternatively, it can receive polychromatic data (e.g., RGB data), in which case apparatus 50 comprises an intensity extractor 56 which extracts the achromatic intensity level from the polychromatic data as further detailed hereinabove. Extractor 56 preferably controls a color transformation unit 62 which is configured to perform color transformations. For example, unit 62 can perform forward transformation of the polychromatic data to a color coordinate-system having an intensity component, e.g., the CIE XYZ color coordinate-system. Optionally and preferably, apparatus 50 comprises a color calculation unit 58 which restores the polychromatic data of each picture-element after the achromatic intensities are replaced with the new achromatic intensities. Unit 58 can also control color transformation unit 62. In this embodiment, unit 58 preferably controls unit 62, to perform the backward transformation to provide new polychromatic data. Alternatively, unit 58 can perform the backward transformation without communicating with unit 62.

Apparatus 50 further comprises a first processing unit 51, which processes the achromatic intensity level of each picture element using a first adaptation procedure, and a second processing unit 52, which processes the achromatic intensity level of each picture element using a second adaptation procedure, as further detailed hereinabove. Apparatus 50 further comprises an intensity combiner 60 which combines the intermediate intensity levels of each picture-element to provide a new achromatic intensity level R associated with the picture-element as further detailed hereinabove (see e.g., Equations 10 and 11).

In various exemplary embodiments of the invention apparatus 50 further comprises a halo artifacts reduction unit 68 which reduces halo artifacts as further detailed hereinabove. Unit 68 preferably communicates with both units 51 and 52 to allow reduction of halo artifacts for each intermediate intensity.

In various exemplary embodiments of the invention apparatus 50 comprises an output unit 64 which outputs the processes image in the form an array of picture-elements each associated with the new achromatic data or the new polychromatic data. Unit 64 can communicate with an image forming device 66, which can be a display device (e.g., a monitor), a printer, a projector and the like.

FIG. 6 is a schematic illustration of an imaging device 70, according to various exemplary embodiments of the present invention. Imaging device 70 comprises an image capturing device 72 and apparatus 50. Image capturing device 72 may be realized, for example, as a camera, a digital camera, a video camera, a CMOS digital camera, a scanner, a computerized tomography scanner, a magnetic resonance imaging scanner, an ultrasonic scanner, an endoscopic imaging device, a radio telescope, a digital telescope or a digital microscope.

It is expected that during the life of this patent many relevant devices for acquiring imagery data will be developed and the scope of the term image capturing device is intended to include all such new technologies a priori.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

Embodiments of the present invention were applied to High dynamic range images in an RGBE format.

Methods

A flowchart diagram of the method is provided in FIG. 7, illustrating, for each of the "On" and "Off" adaptation procedures, the spatial profiles and the adaptation functions of the various regions.

The achromatic intensity was extracted from the polychromatic data of the images. This was performed by transforming each pixel in the RGBE image to CIE XYZ using the D65 sRGB transform matrix [IEC 61966-2-1:1999]. The achromatic intensity of each pixel was defined as the Y value of the pixel. Further transformation from the CIE XYZ space to CIE xyz was performed for each pixel, and the x,z, values were applied to the new achromatic intensities yielded according to various exemplary embodiments of the present invention.

Halo artifacts were reduced using the varying threshold determined by the log of the dynamic range of the image. In addition, the deviated pixels in the surround and remote areas get the intensity value of the center pixel. Formally, Equations 12 and 13 below were used in the calculations of $G_{srnd}$ and $G_{rem}$, respectively.

$$I = \begin{cases} I_c & I/I_c > 0.2 \ln(I_{max}/I_{min}) \text{ or} \\ & I_c/I > 0.3 \ln(I_{max}/I_{min}) \\ I & \text{else} \end{cases} \quad (EQ. 12)$$

$$I = \begin{cases} I_c & I/I_c > 0.5 \ln(I_{max}/I_{min}) \text{ or} \\ & I_c/I > 0.15 \ln(I_{max}/I_{min}) \\ I & \text{else} \end{cases} \quad (EQ. 13)$$

Where $I_c$ is the center pixel intensity, $I_{max}$ is the maximal pixel intensity in the image and $I_{min}$ is the minimal pixel intensity in the image. The chosen thresholds for the center and surround regions were determined empirically, driven by the motivation to obtain minimal number of pixels outside the threshold and to reduce halo artifacts. For this procedure 100 HDR images were used.

The center region was defined as a single pixel. The surrounding region was defined as having an outer pixel radius of 3 pixels. The remote region was defined by an annulus with an inner radius of 9 pixels and an outer radius of about 18 pixels. The effect of the remote region radii was tested during the experiments.

The calculations in each adaptation procedure were performed in accordance with Equations 1-6, above, supplemented with Equations 12 and 13 for reducing halo artifacts.

Tables 1 and 2 below summarize the parameters used in the "On" and "Off" adaptation procedures.

TABLE 1

| Adaptation Procedure | $\alpha_{cen}$ | $\beta_{cen}$ | $c'_{cen}$ | $\alpha_{srnd}$ | $\beta_{srnd}$ | $c_{srnd}$ | $d_c$ | $d_s$ |
|---|---|---|---|---|---|---|---|---|
| On | 1.4 | $2I_{max}$ | 10 | 1.6 | $2I_{max}$ | 20 | 3 | −3 |
| Off | 2.4 | $0.7\sqrt{I_{min}I_{max}}$ | 20 | 3 | $0.7\sqrt{I_{min}I_{max}}$ | 28 | 3.3 | −3.3 |

TABLE 2

| Adaptation Procedure | $m_{cen}$ | $m_{1,center}$ | $k_{1,center}$ | $m_{srnd}$ | $m_{1,srnd}$ | $k_{1,srnd}$ |
|---|---|---|---|---|---|---|
| On | $0.2\sqrt{I_{min} \cdot I_{max}}$ | $\dfrac{4000}{I_{max}}$ | $\log\left(\dfrac{I_{max}}{I_{min}}\right)$ | $0.2\sqrt{I_{min} \cdot I_{max}}$ | $\dfrac{4000}{I_{max}}$ | $\log\left(\dfrac{I_{max}}{I_{min}}\right)$ |
| Off | $\sqrt{I_{min} \cdot I_{max}}$ | $\dfrac{4000}{I_{max}}$ | $\log\sqrt{\dfrac{I_{max}}{I_{min}}}$ | $\dfrac{\sqrt{I_{min} \cdot I_{max}}}{28}$ | $\dfrac{4000}{I_{max}}$ | $\log\sqrt{\dfrac{I_{max}}{I_{min}}}$ |

In each procedure, the central and peripheral saturation functions were combined according to Equation 10. FIG. 8 illustrates the effective saturation functions of the "On" and "Off" adaptation procedures. The two types of effective saturation functions are presented schematically as response curves showing how the intermediate intensities are calculated as a function of the pixel's luminance, its surround and remote context. The intermediate intensities obtained during the adaptation procedures were combined using Equation 11.

The computation time ranged from about 11 seconds for a 748 by 492 image to about 20 seconds for a 1024 by 768 image on a 3600 MHz Pentium 4. The method was capable of automatically updating the images without manual modification of the parameters.

Results and Discussion

FIGS. 9A-B demonstrate the effect of the weight of the "Off" component on the quality of the image. The original HDR image was obtained through the courtesy of Michael Werman. FIGS. 9A-B demonstrates the advantages of employing the two different adaptation procedures. In FIG. 9A the weight of the "Off" component is low, resulting in an image in which the room interior becomes dimmer and some details become less apparent (the sign on the wall and sculpture face). In FIG. 9B, weight of the "Off" component is higher, resulting in an image in which many more details are vivid. The use of low weight for the "Off" component is advantageous when it is desired to provide more natural image, while the use of high weight for the "Off" component is advantageous when it is desired to expose more details, e,g, for computer search algorithms.

FIGS. 10A-C and 11A-C present results obtained by applying the method of the present embodiments on two HDR images. The original HDR image of FIGS. 10A-C was obtained through the courtesy of Erik Reinhard, and the original HDR image of FIGS. 11A-C was obtained through the Paul Debevec's website. Shown in FIGS. 10A-C and 11A-C are the results obtained when only the "On" procedure was employed (FIGS. 10A and 11A), only the "Off" procedure was employed (FIGS. 10B AND 11B), and both procedures (FIGS. 10C and 11C). As shown, the "On" procedure facilitates appearance of high intensity regions in the image (see e.g., the window, lamp and mirror reflection in FIG. 10A), while the "Off" procedure facilitates appearance dimmer regions (see, e.g., room interior in FIG. 10B). looking at the bright areas as in the window (FIG. 10C), it can be seen that the "On" intermediate intensity (FIG. 10A) is riding on a constant level of the "Off" intermediate intensity (FIG. 10B), thus the total intensity at the window is brighter than the intensity of the "On" intermediate intensity.

FIGS. 12A-D and 13A-D present the intermediate (FIGS. 12A-B and 13A-B) and new (FIGS. 12C-D and 13C-D) intensity as a function of the luminance of the original image. Plots 12A-D correspond to the images in FIGS. 10A-C and plots 13A-D correspond to the images in FIGS. 11A-C. The plots in FIGS. 12A, 12C, 13A and 13C are on linear scale along the abscissa and the plots in FIGS. 12B, 12D, 13B and 13D are on logarithmic scale along the abscissa. The numbers on the scales are in arbitrary units. It is expected that a different output luminance value will be obtained for a luminance in the original image according to its context. Therefore, the obtained levels are non-injective (one to one) functions of the image original luminance values. This property is expressed in the thickness of each curve which according to various exemplary embodiments of the present invention represents the amount of adaptation (curve-shifting).

FIGS. 14A-D present the image in FIG. 11C as processed using four different scenarios. In FIG. 14A the processing was using the parameters in Tables 1 and 2, in FIG. 14B the processing was with no nonlocal adaptation, in FIG. 14C the processing was with no local adaptation, and in FIG. 14D the processing was with no adaptation. FIGS. 14E-H are enlarged views of the marked squares in FIGS. 14A-D (respectively). The new and intermediate intensity levels as a function of the log of luminance of the original image are shown in FIGS. 15A-D (new intensity) and 16A-D (intermediate intensity), where FIGS. 15A and 16A correspond to FIG. 14a, FIGS. 15B and 16B correspond to FIG. 14B, etc.

FIGS. 17A-D present another image as processed using the four scenarios described with respect to FIGS. 14A-D above.

The original HDR image was obtained through courtesy of Michael Werman. The new and intermediate intensity levels as a function of the log of luminance of the original image are shown in FIGS. 18A-D (new intensity) and 19A-D (intermediate intensity). Better results obtained using the parameters in Tables 1 and 2.

FIGS. 20A-D and 21A-D present images obtained for different values of the c' parameters. FIGS. 20A and 21A correspond to the values in Table 1 with the replacement c'→2C', FIGS. 20B and 21B correspond to the values in Table 1 without modification, FIGS. 20C and 21C correspond to the values in Table 1 with the replacement c'→0.5c', and FIGS. 20D and 21D correspond to the values in Table 1 with the replacement c'→0. As shown, finer details appear in the image for larger values of c'.

FIGS. 22A-B show an image obtained with (FIG. 22B) and without (FIG. 22A) the application of the halo artifact reduction procedure of Equations 12 and 13. The original HDR image was obtained through the courtesy of Greg Ward. The black halos which appear around the lamps in FIG. 22A, were successfully removed as shown in FIG. 22B.

Figure 23A:
Figure 23B:
Figure 23C:
Figure 23D:

FIGS. 23A-D demonstrate the influence of post processing on images obtained according to various exemplary embodiments of the present invention. The original HDR image was obtained through the courtesy of SpheronVR AG. FIG. 23A shows the image as obtained using the parameters of Tables 1 and 2 with no further modification, FIG. 23B shows the image of FIG. 23A after applying 1% clipping of low and high intensity levels, FIG. 23C shows the image of FIG. 23A after applying 1% clipping and color saturation enhancement, and FIG. 23C shows the image of FIG. 23A after applying histogram equalizing.

Figure 24A:
Figure 24B:
Figure 24C:
Figure 24D:
Figure 24E:
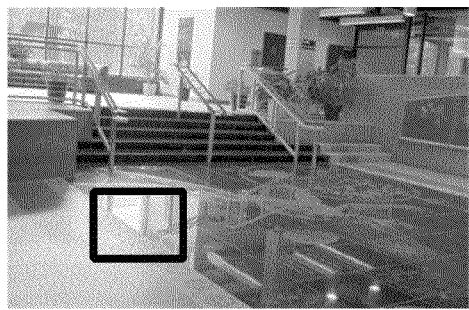
Figure 24F:
Figure 24G:
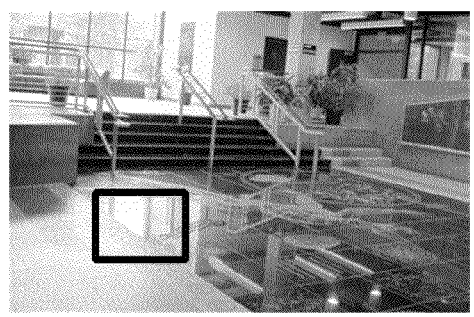
Figure 24H:

FIGS. 24A-H demonstrate the influence of clipping, color saturation enhancement and histogram equalizing on another image. The original HDR image was obtained through the courtesy of Munsell Color Science Laboratory. FIG. 24A shows the image as obtained using the parameters of Tables 1 and 2 with no further modification, FIG. 24C shows the image of FIG. 24A after applying 1% clipping of low and high intensity levels, FIG. 24E shows the image of FIG. 24A after applying 1% clipping and color saturation enhancement, and FIG. 24G shows the image of FIG. 24A after applying histogram equalizing. FIGS. 24B, 24D, 24F and 24H are enlarged views of the marked squares in FIGS. 24A, 24C, 24E and 24G, respectively.

The present examples demonstrate the ability of embodiments of the present invention to perform automatic high dynamic range compression. The difference between the dynamic ranges of the original and processed image was up to about $10^{10}$ levels of intensity. The results demonstrate a significant compression while preserving, and even slightly enhancing the details in the images, both in the bright and dark zones. The automatic wide dynamic range compression has been applied for a large number of images. Although most of the experiments were performed using the same set of parameters, the dynamic compression was successful in all processed images. Yet, the technique of the present embodiments can be applied to different extents by assigning different values to the parameters.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of processing a digital image having a plurality of picture-elements, the method comprising, for each picture element of the digital image:
   (a) processing an achromatic intensity level of said picture element using a first adaptation procedure featuring a first effective saturation function of said achromatic intensity, to provide a first intermediate intensity level;
   (b) processing said achromatic intensity level using a second adaptation procedure featuring a second effective saturation function of said achromatic intensity, to provide a second intermediate intensity level; and
   (c) combining said first and said second intermediate intensity levels to provide a new achromatic intensity level associated with said picture-element, thereby processing the digital image.

2. The method of claim 1, wherein each of said first and said second effective saturation functions is characterized by an increment rate and a plateau level, and wherein the plateau level of said first effective saturation function is higher than the plateau level of said second effective saturation function.

3. The method of claim 2, wherein the increment rate of said first effective saturation function is higher than the increment rate of said second effective saturation function.

4. The method of claim 1, wherein said picture element is associated with polychromatic data and the method further comprises extracting said achromatic intensity level from said polychromatic data.

5. The method of claim 4, further comprising calculating new polychromatic data using said new achromatic intensity level, and associating said new polychromatic data with said picture-element.

6. The method of claim 1, further comprising employing a procedure for reducing halo artifacts from the digital image.

7. The method of claim 1, adapted for reducing a dynamic range of the digital image by at least 5 orders of magnitude.

8. Apparatus for processing a digital image having a plurality of picture-elements, the apparatus comprising:
   (a) a first processing unit, for processing an achromatic intensity level of each picture element using a first adaptation procedure featuring a first effective saturation function of said achromatic intensity, to provide a first intermediate intensity level;
   (b) a second processing unit, for processing an achromatic intensity level of each picture element using a second adaptation procedure featuring a second effective saturation function of said achromatic intensity, to provide a second intermediate intensity level; and
   (c) an intensity combiner, for combining, for each picture-element, a respective first intermediate intensity level and a respective second intermediate intensity level to provide a new achromatic intensity level associated with said picture-element.

9. An imaging device, comprising an image capturing device for capturing a digital image, and the apparatus of claim 8, for processing said digital image.

10. The apparatus of claim 8, wherein said picture element is associated with polychromatic data and the apparatus further comprises an intensity extractor for extracting said achromatic intensity level from said polychromatic data.

11. The apparatus of claim 10, wherein the apparatus further comprises a calculation unit for calculating new polychromatic data using said new achromatic intensity level, and associating said new polychromatic data with said picture-element.

12. The apparatus of claim 8, wherein the apparatus further comprises a halo artifacts reduction unit configured for employing a procedure for reducing halo artifacts from the digital image.

13. The apparatus of claim 8, wherein the apparatus is adapted for reducing a dynamic range of the digital image by at least 5 orders of magnitude.

14. The method of claim 1, wherein said new achromatic intensity level is a sum of said first and said second intermediate intensity levels.

15. The method of claim 14, wherein said sum is a weighted sum.

16. The method of claim 6, wherein said procedure for reducing said halo artifacts is characterized by an intensity threshold which is a function of a dynamic range characterizing the digital image.

17. The method of claim 1, wherein at least one of said first adaptation procedure and said second adaptation procedure comprises a positive contribution calculated using a central saturation function, and a negative contribution calculated using a peripheral saturation function being different from said central saturation function.

18. The method of claim 17, wherein each saturation function comprises an adaptation function having a local term and a nonlocal term.

19. The method of claim 1, wherein said intensity level is static, and said plurality of picture elements constitutes a still image.

20. The method of claim 1, wherein said intensity level varies with time and said plurality of picture elements constitutes a sequence of images.

21. The method of claim 20, wherein said sequence of images is a video sequence of images.

22. The imaging device of claim 9, wherein said image capturing device is selected from the group consisting of a digital camera, a video camera and a CMOS digital camera, a scanner, a computerized tomography scanner, a magnetic resonance imaging scanner, an ultrasonic scanner, an endoscopic imaging device, a radio telescope, a digital telescope and a digital microscope.

* * * * *